(12) United States Patent
Kurokawa et al.

(10) Patent No.: US 9,370,832 B2
(45) Date of Patent: Jun. 21, 2016

(54) CUTTING INSERT AND CUTTING TOOL WITH REPLACEABLE CUTTING EDGE

(71) Applicant: TUNGALOY CORPORATION, Iwaki-shi, Fukushima (JP)

(72) Inventors: Masahiro Kurokawa, Iwaki (JP); Takashi Yamaguchi, Iwaki (JP)

(73) Assignee: Tungaloy Corporation, Iwaki-shi, Fukushima (JP)

( * ) Notice: Subject to any disclaimer, the term of this patent is extended or adjusted under 35 U.S.C. 154(b) by 214 days.

(21) Appl. No.: 14/376,296

(22) PCT Filed: Feb. 19, 2013

(86) PCT No.: PCT/JP2013/054053
§ 371 (c)(1),
(2) Date: Aug. 1, 2014

(87) PCT Pub. No.: WO2013/125542
PCT Pub. Date: Aug. 29, 2013

(65) Prior Publication Data
US 2014/0377020 A1 Dec. 25, 2014

(30) Foreign Application Priority Data

Feb. 20, 2012 (JP) ................................. 2012-033990

(51) Int. Cl.
*B23C 5/22* (2006.01)
*B23C 5/20* (2006.01)
*B23C 5/08* (2006.01)
(Continued)

(52) U.S. Cl.
CPC ............... *B23C 5/20* (2013.01); *B23B 27/1659* (2013.01); *B23C 5/08* (2013.01); *B23C 5/207* (2013.01);
(Continued)

(58) Field of Classification Search
CPC .. B23C 5/207; B23C 5/202; B23C 2200/203; B23C 2200/208; B23C 2200/28; B23C 2200/08; B23C 2200/0477; B23C 2200/0405; B23C 2200/0483
See application file for complete search history.

(56) References Cited

U.S. PATENT DOCUMENTS 5,951,212 A 9/1999 Emoto et al.
8,641,331 B2 * 2/2014 Zastrozynski .......... B23C 5/202
407/113
(Continued)

FOREIGN PATENT DOCUMENTS

| JP | 8-323510 | 12/1996 |
| JP | H09-103909 | 4/1997 |
| JP | 2000-107923 | 4/2000 |

OTHER PUBLICATIONS

International Search Report in PCT/JP2013/054053, dated May 28, 2013.
(Continued)

*Primary Examiner* — Will Fridie, Jr.
(74) *Attorney, Agent, or Firm* — Womble Carlyle

(57) ABSTRACT

A cutting insert has cutting edge portions at intersection ridge portions between each of two end surfaces at the opposite side to each other and the peripheral side surface. Both the end surfaces are formed to be plane-symmetrical. In each end surface, long side portions and short side portions are alternately connected through raised corners or lowered corners. Each cutting edge portion is formed in regard to the raised corner, and has a corner cutting edge formed in the raised corner, a major cutting edge connected to the corner cutting edge and extending in the long side portion, and a minor cutting edge connected to the corner cutting edge at the opposite side and extending in the short side portion.

12 Claims, 20 Drawing Sheets

(51) Int. Cl.
 *B23B 27/16* (2006.01)
 *B23C 5/06* (2006.01)
(52) U.S. Cl.
 CPC . *B23B 2200/0495* (2013.01); *B23C 2200/0411* (2013.01); *B23C 2200/0483* (2013.01); *B23C 2200/085* (2013.01); *B23C 2200/125* (2013.01); *B23C 2200/208* (2013.01); *Y10T 407/1942* (2015.01); *Y10T 407/23* (2015.01)

(56) References Cited

U.S. PATENT DOCUMENTS

| | | | | |
|---|---|---|---|---|
| 8,777,524 | B2* | 7/2014 | Choi | B23C 5/109 |
| | | | | 407/113 |
| 8,905,686 | B2* | 12/2014 | Hausmann | B23C 5/06 |
| | | | | 407/113 |
| 2003/0202849 | A1 | 10/2003 | Gamble et al. | |
| 2007/0071559 | A1* | 3/2007 | Koskinen | B23B 27/16 |
| | | | | 407/34 |
| 2012/0275868 | A1 | 11/2012 | Saito et al. | |
| 2015/0190868 | A1* | 7/2015 | Koifman | B23C 5/207 |
| | | | | 407/11 |

OTHER PUBLICATIONS

International Preliminary Report on Patentability (IPRP) issued on Sep. 4, 2014 in PCT counterpart application (PCT/JP2013/054053).

* cited by examiner

CUTTING INSERT AND CUTTING TOOL WITH REPLACEABLE CUTTING EDGE

RELATED APPLICATIONS

This is a 371 US National Phase of International Patent Application No. PCT/JP2013/054053 filed Feb. 19, 2013, and published as WO2013/125542A1 on Aug. 29, 2013, which claims priority to JP 2012-033990, filed Feb. 20, 2012. The contents of the aforementioned applications are incorporated by reference in their entirety.

TECHNICAL FIELD

The present invention relates to a cutting insert, and an edge replacement type cutting tool in which the cutting insert is mounted. Particularly, the present invention relates to a cutting insert used for performing groove processing (slot processing), and an edge replacement type cutting tool in which the cutting insert is mounted.

BACKGROUND ART

There is conventionally provided an edge replacement type side cutter as one of rotary cutting tools that can perform groove processing. In the edge replacement type side cutter, a plurality of cutting inserts are typically disposed in a staggered configuration on an outer peripheral portion of the side cutter body. In such a side cutter, an overlap amount between a rotation trace of a cutting edge for groove bottom processing in the cutting insert attached to one end surface of the side cutter body and a rotation trace of a cutting edge for groove bottom processing in the cutting insert attached to the other end surface of the side cutter body is set to be a predetermined amount.

Patent Literature 1 discloses a side cutter in which a plurality of cutting inserts are disposed in a staggered configuration. The cutting insert of this side cutter has upper and lower surfaces each of which is formed in a parallelogram shape.

On the other hand, there is a milling cutter that is used as one of the rotary cutting tools. Patent Literature 2 discloses a cutting insert for the milling cutter. The cutting insert has a substantially hexagonal shape in a planar view, and is a negative type cutting insert. The cutting insert is configured such that an edge portion of each of an upper surface and a lower surface thereof is provided with three cutting edge portions each of which is formed along the corner of each surface, and a total of six corners of the upper and lower surfaces can be used for cutting. Lengths of the side portions of the upper and lower surfaces all are substantially equal, and the length of each side portion is approximately a half of the width of the cutting insert. In this cutting insert, two side portions each having an equal length extend in different directions from one corner having a corner inner angle of 90 degrees in a planar view, and a major cutting edge and a minor cutting edge in a single cutting edge portion are formed in each of these side portions.

In addition, Patent Literature 3 discloses a cutting insert that is used in an end mill and has a substantially hexagonal upper surface. The upper surface of the cutting insert has a rotation symmetrical shape around an axis, and has long side portions and short side portions disposed alternately. Cutting edges of this cutting insert are formed only in an edge portion of the upper surface, and the cutting edge comprises a side edge formed in the long side portion and a bottom edge formed in the short side portion. Further, in the cutting insert, for improving discharge of chips, a width of a chip breaker in a direction of crossing the cutting edge is gradually wider and a depth of the chip breaker is gradually deeper from a leading end of the cutting edge to a rear end of the cutting edge.

CITATION LIST

Patent Literature

PTL 1: Japanese Patent Laid-Open No. 2000-107923
PTL 2: WO2007/037733
PTL 3: Japanese Patent Laid-Open No. H09-103909 (1997)

SUMMARY OF INVENTION

Technical Problem

Incidentally at present it is required to increase cutting edges, that is, the number of the cutting edges that are usable in one cutting insert by a demand for cost reduction from the market. This requirement is applied similarly to the cutting insert for side cutter as shown in Patent Literature 1 as described above.

In addition, in the side cutter it is desired to be able to process grooves having various kinds of widths using a plurality of cutting inserts of the same kind. In the side cutter, a plurality of cutting inserts are generally disposed in a staggered configuration in a tool body such that rotation traces of cutting edges for groove bottom processing overlap with each other. A width of a cutting part of this side cutter depends not only on a width of a plurality of the cutting edges for groove bottom processing but also depends on a width of the entire cutting insert at the time of disposing the cutting edges for groove bottom processing substantially in parallel to a rotation axis of the side cutter body. Therefore, for example, in a case of attaching a cutting insert similarly having the characteristics of the cutting insert according to Patent Literature 2 to a side cutter as a cutting insert for side cutter, the cutting insert is positioned such that a cutting edge not in use adjacent to a usable cutting edge protrudes largely laterally from the usable cutting edge. Therefore, this cutting insert and this side cutter may be unsuitable for cutting the groove having a narrow width.

Further, there is a particular problem in the groove processing. The problem is to, for preventing chips generated by cutting from damaging a groove wall, appropriately control the outflow (for example, the outflow direction) of the chips. Provision of the chip breaker having the above shape to the cutting insert as in the cutting insert described in Patent Literature 3 as described above, has a limitation in controlling the discharge direction, that is, the outflow direction of the chip.

The present invention has an object of providing a cutting insert created in view of the foregoing problems, and a cutting tool in which the cutting insert is mounted.

In addition, the present invention has a further object of providing a cutting insert, in which the number of corners usable for cutting is large, that is excellent in capabilities of processing grooves having various widths and is excellent in controllability of a discharge direction of chips, and a rotary cutting tool that can be used as a side cutter in which the cutting insert is mounted.

Solution to Problem

According to an aspect in the present invention, there is provided a cutting insert comprising:

a first end surface and a second end surface at the opposite side to each other, each of the first end surface and the second end surface having a contour of substantial rotation symmetry around an axis defined to extend through the first end surface and the second end surface, the contour of the first end surface and the contour of the second end surface being substantially plane-symmetrical about a median plane which is defined to be perpendicular to the axis and bisect the cutting insert, each of the first end surface and the second end surface being configured in a way that raised corners and lowered corners each having an inner angle larger than that of the raised corner and being closer to the median plane than the raised corner are alternately positioned;

a peripheral side surface extending between the first end surface and the second end surface;

at least three first cutting edge portions formed in an intersection ridge portion between the first end surface and the peripheral side surface, each including a corner cutting edge, a major cutting edge and a minor cutting edge in such a manner that the corner cutting edge extends along the related raised corner, the major cutting edge extends from one end portion of the corner cutting edge toward one lowered corner adjacent thereto, and the minor cutting edge extends from the other end portion of the corner cutting edge toward the other lowered corner adjacent thereto, wherein a distance between the raised corner and the one lowered corner between which the major cutting edge extends is longer than a distance between the raised corner and the other lowered corner between which the minor cutting edge extends, the major cutting edge has an inclined section closer to the median plane as a distance from the corner cutting edge is increased, and the minor cutting edge has an inclined section closer to the median plane as a distance from the corner cutting edge is increased; and at least three second cutting edge portions formed in an intersection ridge portion between the second end surface and the peripheral side surface, each including a corner cutting edge, a major cutting edge and a minor cutting edge in such a manner that the corner cutting edge extends along the related raised corner, the major cutting edge extends from one end portion of the corner cutting edge toward one lowered corner adjacent thereto, and the minor cutting edge extends from the other end portion of the corner cutting edge toward the other lowered corner adjacent thereto, wherein a distance between the raised corner and the one lowered corner between which the major cutting edge extends is longer than a distance between the raised corner and the other lowered corner between which the minor cutting edge extends, the major cutting edge has an inclined section closer to the median plane as a distance from the corner cutting edge is increased, and the minor cutting edge has an inclined section closer to the median plane as a distance from the corner cutting edge is increased.

According to the aspect in the present invention having the above configuration, in each of the first cutting edge portion and the second cutting edge portion, the distance between the raised corner and the one lowered corner between which the major cutting edge extends is longer than the distance between the raised corner and the other lowered corner between which the minor cutting edge extends, the major cutting edge has the inclined section closer to the median plane as a distance from the corner cutting edge is increased, and the minor cutting edge has the inclined section closer to the median plane as a distance from the corner cutting edge is increased. Therefore, this cutting insert can be used for processing grooves having various kinds of widths as the cutting insert for side cutting, and can contribute to discharging chips appropriately. In addition, since this cutting insert includes at least the three first cutting edge portions and at least the three second cutting edge portions, this cutting insert includes at least six cutting edge portions.

Preferably in each of the first cutting edge portions, the corner cutting edge is formed substantially in parallel to the median plane, and in each of the second cutting edge portions, the corner cutting edge is formed substantially in parallel to the median plane.

Preferably a distance between the first cutting edge portion and the median plane is the shortest at a section in the major cutting edge of the first cutting edge portion, the section being away from the adjacent lowered corner, and a distance between the second cutting edge portion and the median plane is the shortest at a section in the major cutting edge of the second cutting edge portion, the section being away from the adjacent lowered corner. In this case, preferably in a planar view of the first end surface the major cutting edge in the first cutting edge portion may be formed to protrude to the cutting insert outward side at the section in the major cutting edge, the section being away from the adjacent lowered corner, and in a planar view of the second end surface the major cutting edge in the second cutting edge portion may be formed to protrude to the cutting insert outward side at the section in the major cutting edge, the section being away from the adjacent lowered corner.

In a case where the major cutting edge of the first cutting edge portion is connected to the minor cutting edge of the adjacent first cutting edge portion at the lowered corner, and the major cutting edge of the second cutting edge portion is connected to the minor cutting edge of the adjacent second cutting edge portion at the lowered corner, a distance between the first cutting edge portion and the median plane may be the shortest at a major cutting edge side end portion of the first cutting edge portion, and a distance between the second cutting edge portion and the median plane may be the shortest at a major cutting edge side end portion of the second cutting edge portion.

In an embodiment, an inner angle of the raised corner in the first end surface is an obtuse angle, wherein a flat cutting edge is formed in the minor cutting edge of the first cutting edge portion, and an inner angle of the raised corner in the second end surface is an obtuse angle, wherein a flat cutting edge is formed in the minor cutting edge of the second cutting edge portion.

Preferably the first end surface includes at least one outside end face portion and an inside end face portion in such a manner that each outside end face portion is adjacent to the related first cutting edge portion and is formed to act as a rake face of the first cutting edge portion, and the inside end face portion is positioned closer to the inside than the outside end face portion and is formed closer to the median plane than the outside end face portion, and the second end surface includes at least one outside end face portion and an inside end face portion in such a manner that each outside end face portion is adjacent to the related second cutting edge portion and is formed to act as a rake face of the second cutting edge portion, and the inside end face portion is positioned closer to the inside than the outside end face portion and is formed closer to the median plane than the outside end face portion. In the first end surface, the outside end face portion may be formed as a single flat surface or a single curved surface, at least more than half of the adjacent first cutting edge portion may extend on a smooth extension plane of the outside end face portion, and in the second end surface, the outside end face portion may be formed as a single flat surface or a single curved surface, at least more than half of the adjacent second cutting edge portion may extend on a smooth extension plane of the outside end face portion.

Preferably in the first end surface, the outside end face portion is discontinuous with the inside end face portion and is inclined to the median plane, and in the second end surface, the outside end face portion is discontinuous with the inside end face portion and is inclined to the median plane.

Preferably the peripheral side surface includes a first side face section connected to the first end surface through the related first cutting edge portion and a second side face section connected to the second end surface through the related second cutting edge portion, and each of the first side face section and the second side face section has a section inclined to the cutting insert outward side toward the median plane. The first side face section may be formed to be adjacent to the major cutting edge and the corner cutting edge in the related first cutting edge portion, the second side face section may be formed to be adjacent to the major cutting edge and the corner cutting edge in the related second cutting edge portion, and a section of the peripheral side surface between the minor cutting edge of the first cutting edge portion and the minor cutting edge of the second cutting edge portion substantially plane-symmetrical to the first cutting edge portion about the median plane may be formed of a single plane.

According to the other aspect of the present invention, there is a rotary cutting tool that is provided with a tool body including a first tool body end surface and a second tool body end surface at the opposite side to each other, and an outer peripheral surface between the first tool body end surface and the second tool body end surface, wherein a plurality of cutting inserts are removably attached to the tool body, comprising:

at least one first insert attaching seat to which the aforementioned cutting insert is attached in such a manner as to use the first cutting edge portion and that is opened to the first tool body end surface; and at least one second insert attaching seat to which the aforementioned cutting insert is attached in such a manner as to use the second cutting edge portion and that is opened to the second tool body end surface.

For better understanding of the present invention, reference will be made of the accompanying drawings for showing how the above-mentioned aspects in the present invention should be achieved.

DESCRIPTION OF EMBODIMENTS

An explanation will be in detail made of embodiments in the present invention with reference to the drawings.

A first embodiment according to the present invention will be explained. A cutting insert 1 in the first embodiment is shown in FIG. 1 to FIG. 4, and a cutting tool 8 in the first embodiment in which a plurality of cutting inserts 1 are removably mounted is shown in FIG. 5 to FIG. 8. The cutting tool 8 is a so-called side cutter, and the cutting insert 1 is a cutting insert for side cutter. However, the cutting insert 1 may be used as a cutting insert for other cutting tools.

Figure 1:
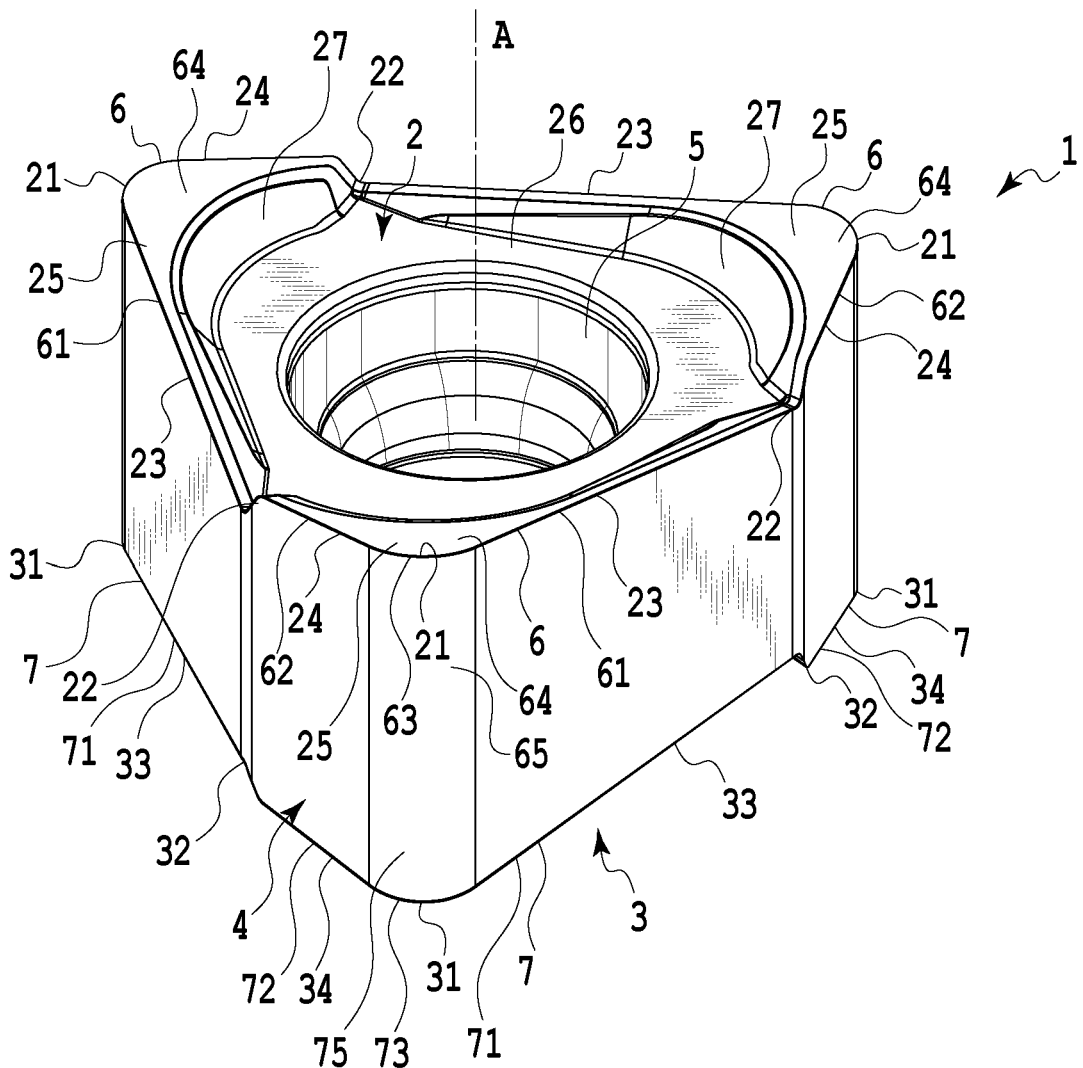
FIG. 1 is a perspective view of a cutting insert according to a first embodiment in the present invention.
Figure 2:
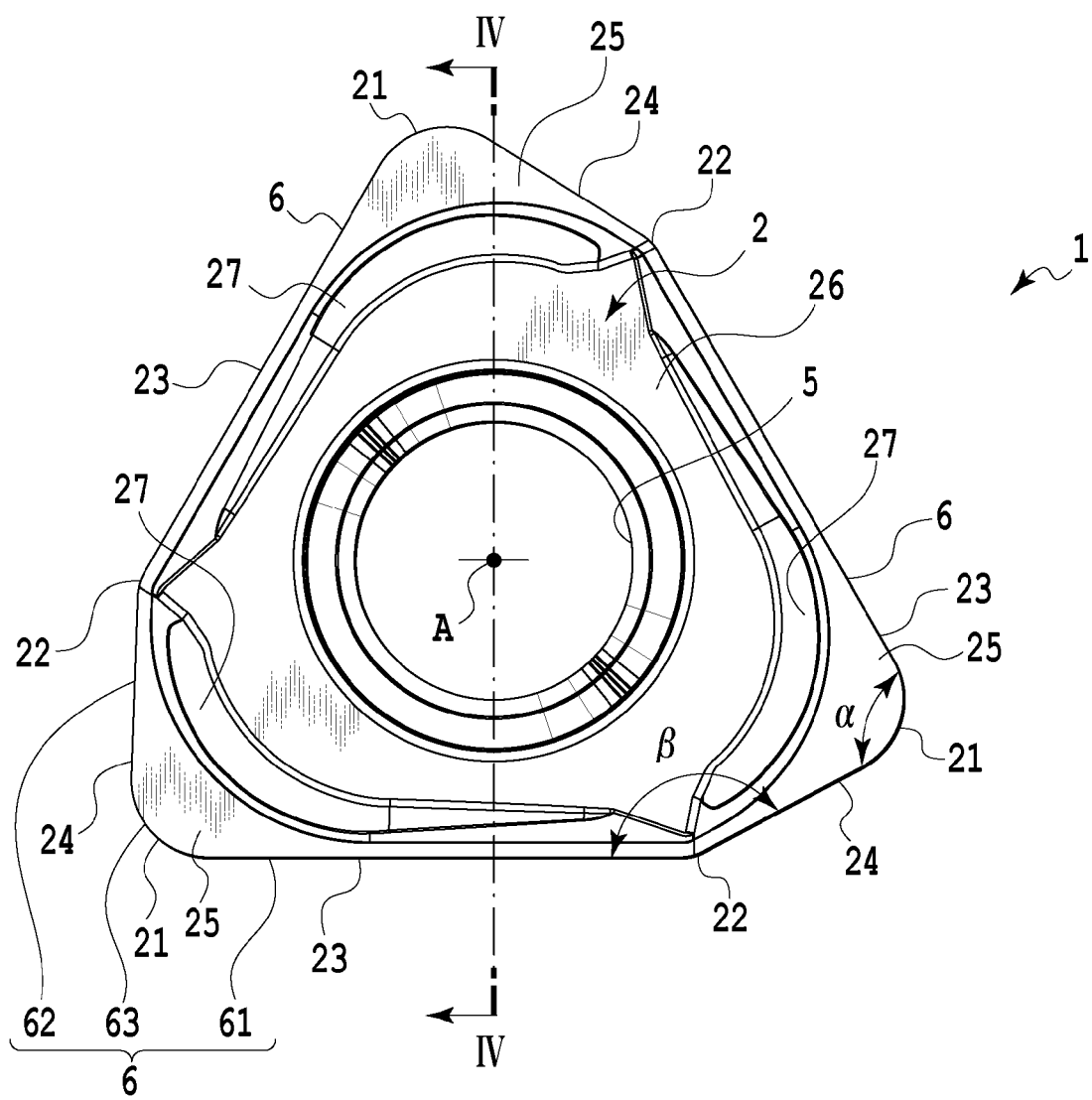
FIG. 2 is a plan view of the cutting insert according to the first embodiment in the present invention.

FIG. 1 shows a perspective view of the cutting insert 1. The cutting insert 1 is provided with two end surfaces 2 and 3 at the opposite side to each other, that is, two opposing end surfaces, and a peripheral side surface 4 extending therebetween, that is, connecting the two end surfaces 2 and 3. Here, one end surface 2 of the two end surfaces 2 and 3 corresponds to a first end surface in the present invention, and the other end surface 3 thereof corresponds to a second end surface in the present invention, but the relationship thereof may be reversed. It should be noted that hereinafter for facilitating understanding of embodiments in the present invention, one of the two end surfaces facing upward in FIGS. 1 and 2 is called an upper surface 2, and the other thereof is called a lower surface 3. In the following explanation, the terms of "upper" and "lower" can be used in the explanation of directions and the other elements based upon a relative positional relationship between the upper surface 2 and the lower surface 3. However, the terms of "upper" and "lower" may be used reversely, which, without mentioning, does not provide any intention that the present invention is to be construed in a limiting manner.

As can be understood from a diagram of viewing the cutting insert 1 in FIG. 2 from the upper surface 2-side, that is, an end surface view or planar view of the cutting insert 1, the upper surface 2 of the cutting insert 1 in the present first embodiment has an outer configuration or a contour in a substantially hexagonal shape in a planar view. Similarly, the lower surface 3 also has a contour in a substantially hexagonal configuration in a planar view. The upper surface 2 intersects substantially at a right angle to the peripheral side surface 4, and similarly the lower surface 3 intersects substantially at a right angle to the peripheral side surface 4. Accordingly, the cutting insert 1 in the present first embodiment is a so-called negative type cutting insert.

The cutting insert 1 is provided with a mounting hole 5 that penetrates through the cutting insert 1 upward and downward in such a manner as to open in a substantial center of each of the upper surface 2 and the lower surface 3. It should be noted that the cutting insert 1 in the first embodiment adopts the mounting hole 5 penetrating through the upper and lower surfaces as the structure of clamping the cutting insert 1, but may adopt the clamping structure of a non-through, dimple type without the mounting hole 5 being formed.

Each of the upper surface 2 and the lower surface 3 is formed to have a substantially rotationally symmetrical shape around an axis A defined to extend through the upper surface 2 and the lower surface 3 in the cutting insert 1. Particularly, the cutting insert 1 has a rotational symmetry through 120 degrees around the axis A (3-fold rotational symmetry) (refer to FIG. 2). Therefore, each of the upper surface 2 and the lower surface 3 is formed to have a contour of a substantially rotational symmetry around the axis A. In the cutting insert 1, however, the mounting hole 5 and the upper and lower surfaces 2 and 3 are formed such that the axis A is in accordance with a center axis of the mounting hole 5.

Here, a plane that is perpendicular to the axis A and bisects the cutting insert 1 is defined, and this plane is called a median plane M. The upper surface 2 and the lower surface 3 of the cutting insert 1 are shaped to be substantially bilaterally symmetric to each other, in other words, are formed to have a substantially plane-symmetrical relationship about the median plane M. Therefore, the upper surface 2 and the lower surface 3 have contours that are formed to be substantially plane-symmetrical about the median plane M.

Therefore an explanation will be hereinafter made primarily of the upper surface 2, and the detailed explanation of the lower surface 3 will be omitted. As apparent from the following explanation because of the above shape of each of the upper surface 2 and the lower surface 3, the cutting insert 1 in the first present embodiment is a cutting insert both surfaces of which are used, and has right hand cutting edges and left hand cutting edges and is an indexable cutting insert. However, in the following explanation, a series of cutting edges are called a cutting edge portion. It should be noted that the right hand cutting edge is a cutting edge positioned to the right at the time of viewing the cutting edge in a direction of an edge in the cutting insert 1 or in the cutting tool 8 which is mounted with the cutting insert 1, and the left hand cutting edge is also defined in the same way.

The upper surface 2 has the substantially hexagonal contour in a planar view as described above. Therefore, six corners and six side portions are provided in an edge portion of the upper surface 2, that is, in an intersection ridge portion (intersection) of the upper surface 2 and the peripheral side surface 4. First corners 21 and second corners 22 are alternately positioned in the edge portion of the upper surface 2. The upper surface 2 has the contour in which first side portions 23 and second side portions 24 are alternately connected in a state where the first corner 21 or the second corner 22 is interposed therebetween. It should be noted that the three first side portions 23 and the three second side portions 24 are provided in the edge portion of the upper surface 2.

Figure 3:
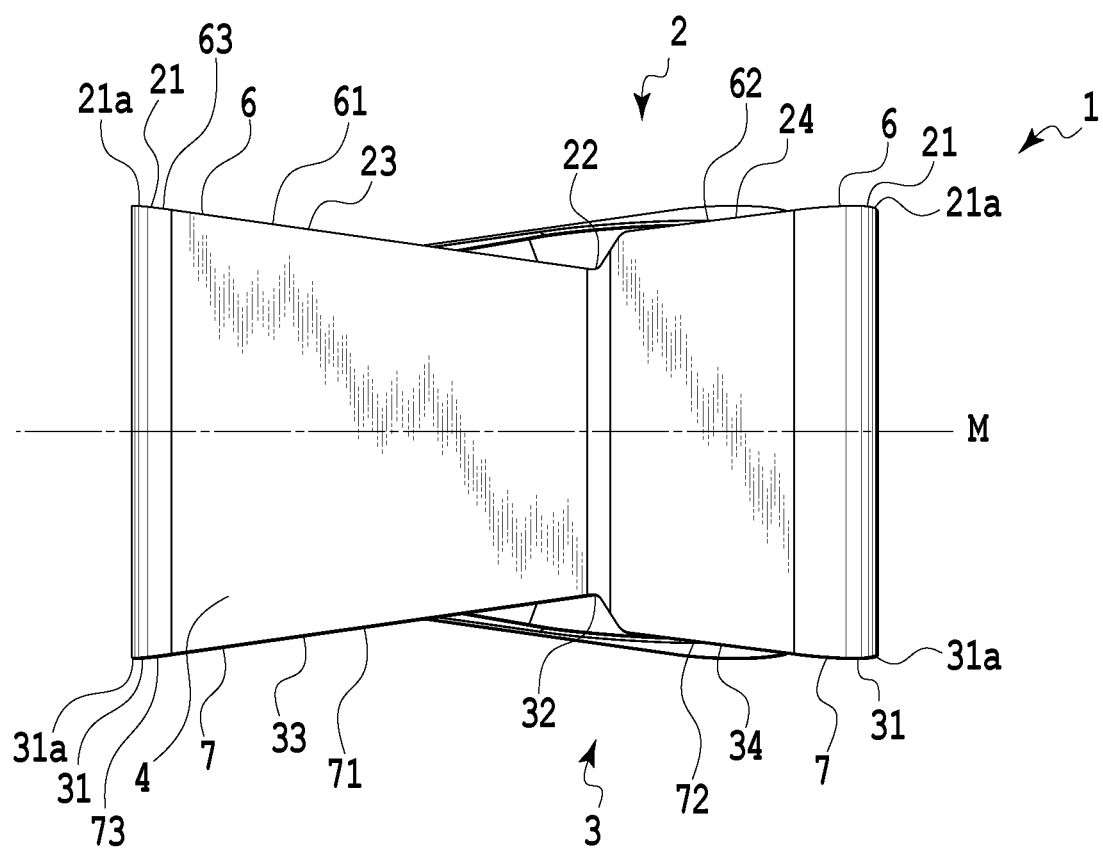
FIG. 3 is a side view of the cutting insert according to the first embodiment in the present invention.

As shown in FIG. 3, since the second corner 22 is closer to the median plane M than the first corner 21, the first corner 21 can be called a raised corner, and on the other hand, the second corner 22 can be called a lowered corner. An angle of the first corner 21 is different from that of the second corner 22, and an inner angle of the first corner 21, that is, the first corner inner angle α is smaller than an inner angle of the second corner 22, that is, the second corner inner angle β. The inner angle relationship between the first and second corners 21 and 22 can be defined in a planar view or an end surface view (refer to FIG. 2) of the cutting insert 1. The inner angle β of the second corner 22 is an obtuse angle. The inner angle α of the first corner 21 is herein a sharp angle, but may be 90 degrees or an obtuse angle. It should be noted that the inner angles of the three first corners 21 are all equal, and the inner angles of the three second corners 22 are also all equal.

The first side portion 23 is different in length from the second side portion 24, and the second portion 24 is shorter than the first side portion 23. Therefore, the first side portion 23 can be called a long side portion, and the second side portion 24 can be called a short side portion. The length relationship between these side portions 23, 24 can be defined in a planar view or an end surface view of the cutting insert 1. In this manner, the upper surface 2 is configured to substantially have as the contour a generally scalene hexagonal shape composed of the first side portions 23 as the three long side portions and the second side portions 24 as the three short side portions. All the lengths of the three first side portions 23 are equal, and all the lengths of the three second side portions 24 are also equal. The side portions 23 and 24 are connected through any of the corners 21 and 22, and the first and second corners 21 and 22 configure connecting portions to the first and second side portions 23 and 24 adjacent to the corners 21 and 22 respectively.

The first side portion 23 as the long side portion is, particularly in a planar view, formed to be longer than at least a length of a half of the maximum width of the cutting insert 1 in a planar view. On top of that, a ratio in length between the first side portion 23 and the second side portion 24 may be determined appropriately in conformity to various conditions such as a width of a groove to be cut. In addition, the first side portions 23 and/or the second side portions 24 may not be straight. A part or an entirety thereof may be configured of a curve.

The lower surface 3 is also configured as similar to the upper surface 2. First corners 31 as raised corners and second corners 32 as lowered corners are alternately provided in the edge portion of the lower surface 3, that is, in an intersection ridge portion of the lower surface 3 and the peripheral side surface 4. The lower surface 3 has the contour in which first side portions 33 as long side portions and second side portions 34 as short side portions are alternately connected through any of the corners 31 and 32. The first and second corners 31 and 32 in the lower surface 3 correspond respectively to the first and second corners 21 and 22 in the upper surface 2, and are configured such that each of them has the same inner angle as that of each of the first and second corners 21 and 22. The first and second side portions 33 and 34 in the lower surface 3 correspond respectively to the first and second side portions 23 and 24 in the upper surface 2, and are configured such that each of them has the same length as that of each of the first and second side portions 23 and 24.

A plurality of cutting edge portions 6, each of which is one set of cutting edges, are formed in the intersection ridge portion between the upper surface 2 and the peripheral side surface 4. A plurality of cutting edge portions 7, each of which is one set of cutting edges, are formed in the intersection ridge portion between the lower surface 3 and the peripheral side surface 4. As can be easily understood from the above explanation, the cutting edge portions 6 and the cutting edge portions 7 of each of the upper and lower surfaces 2 and 3 are each formed to be substantially rotationally symmetric around the axis A, and further, the cutting edge portions 6 of the upper surface 2 and the cutting edge portions 7 of the lower surface 3 are formed to have a plane-symmetric relationship about the median plane M. Therefore, an explanation will be hereinafter made primarily of the cutting edge portion 6 of the upper surface 2-side, and a detailed explanation of the cutting edge portion 7 of the lower surface 3-side will be omitted. It should be noted that the cutting edge portion 6 of the upper surface side corresponds to a first cutting edge portion in the present invention, and the cutting edge portion 7 of the lower surface side corresponds to a second cutting edge portion in the present invention, but these relationships may be reverse.

In the upper surface 2-side, each of the cutting edge portions 6 is formed in regard to the first corner 21, and includes a major cutting edge 61, a minor cutting edge 62 and a corner cutting edge 63 connecting these cutting edges 61 and 62. The corner cutting edge 63 is formed along the first corner 21. The major cutting edge 61 is formed to extend from one end portion of the corner cutting edge 63 toward one second corner 22 adjacent thereto. The minor cutting edge 62 is formed to extend from the other end portion of the corner cutting edge 63 toward another second corner 22 adjacent thereto. It should be noted that herein, since the cutting edge portion 6 corresponds to a first cutting edge portion, the major cutting edge 61 can be called a first major cutting edge, the minor cutting edge 62 can be called a first minor cutting edge, and the corner cutting edge 63 can be called a first corner cutting edge.

The major cutting edge 61 is formed to extend along the first side portion 23. The minor cutting edge 62 is formed to extend along the second side portion 24. The major cutting edge 61 is longer than the minor cutting edge 62 to correspond to a relation that the first side portion 23 is longer than the second side portion 24. That is, a distance between the first corner 21 and the second corner 22 between which the major cutting edge 61 extends, is longer than a distance between the first corner 21 and the second corner 22 between which the minor cutting edge 62 extends. In the cutting insert 1 in the first embodiment, the major cutting edge 61 extends substantially over the entirety of the first side portion 23, and reaches the second corner 22 adjacent thereto. Similarly, the minor cutting edge 62 also extends substantially over the entirety of the second side portion 24, and reaches the second corner 22 adjacent thereto. In short, in the cutting insert 1 in the first embodiment, one cutting edge portion 6 extends over the entire range between the second corners 22 adjacent thereto, and connect to the two cutting edge portions 6 adjacent thereto at both the sides, that is, at the second corners 22 of both the sides. In this way, here, the plurality of the cutting edge portions 6 are continuous through the second corners 22 to each other, but may be not continuous.

Similarly, the cutting edge portion 7 of the lower surface 3-side is also formed in regard to the first corner 31, and is continuous with the different cutting edge portion 7 at the second corner 32. Each cutting edge portion (that is, second cutting edge portion) 7 includes a corner cutting edge (that is, a second corner cutting edge) 73 extending along the first corner 31, a major cutting edge (that is, a second major cutting edge) 71 formed in the first side portion 33 to be continuous with one end portion of the corner cutting edge 73, and a minor cutting edge (that is, a second minor cutting edge) 72 formed in the second side portion 34 to be continuous with the other end portion of the corner cutting edge 73.

A rake face 64 to each cutting edge portion 6 of the upper surface 2 extends in an end surface adjacent thereto, that is, the upper surface 2, and a flank face 65 to each cutting edge portion 6 extends in the peripheral side surface 4. Similarly, a rake face 74 to each cutting edge portion 7 of the lower surface 3 extends in an end surface adjacent thereto, that is, the upper surface 2, and a flank face 75 to each cutting edge portion 7 extends in the peripheral side surface 4.

Each of the first corners 21 and 31 is formed to act as a cutting corner in the side cutter 8. Each of the corner cutting edges 63 and 73 of the cutting corner is configured to be involved in cutting a corner portion of a groove. Each of the major cutting edges 61 and 71 is configured to be involved in cutting a bottom portion of the groove, and each of the minor cutting edges 62 and 72 is configured to be involved in cutting a side wall portion of the groove.

Figure 9:
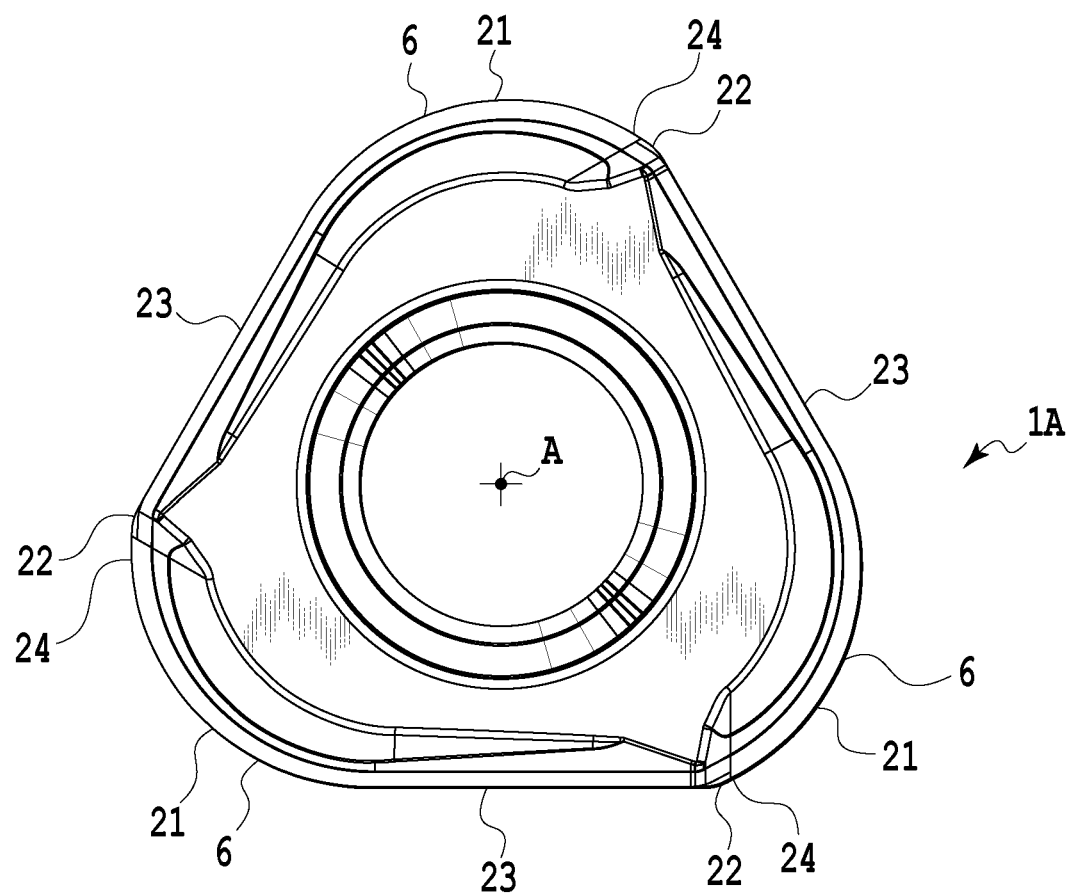
FIG. 9 is a plan view of a cutting insert according to a second embodiment in the present invention.
Figure 10:
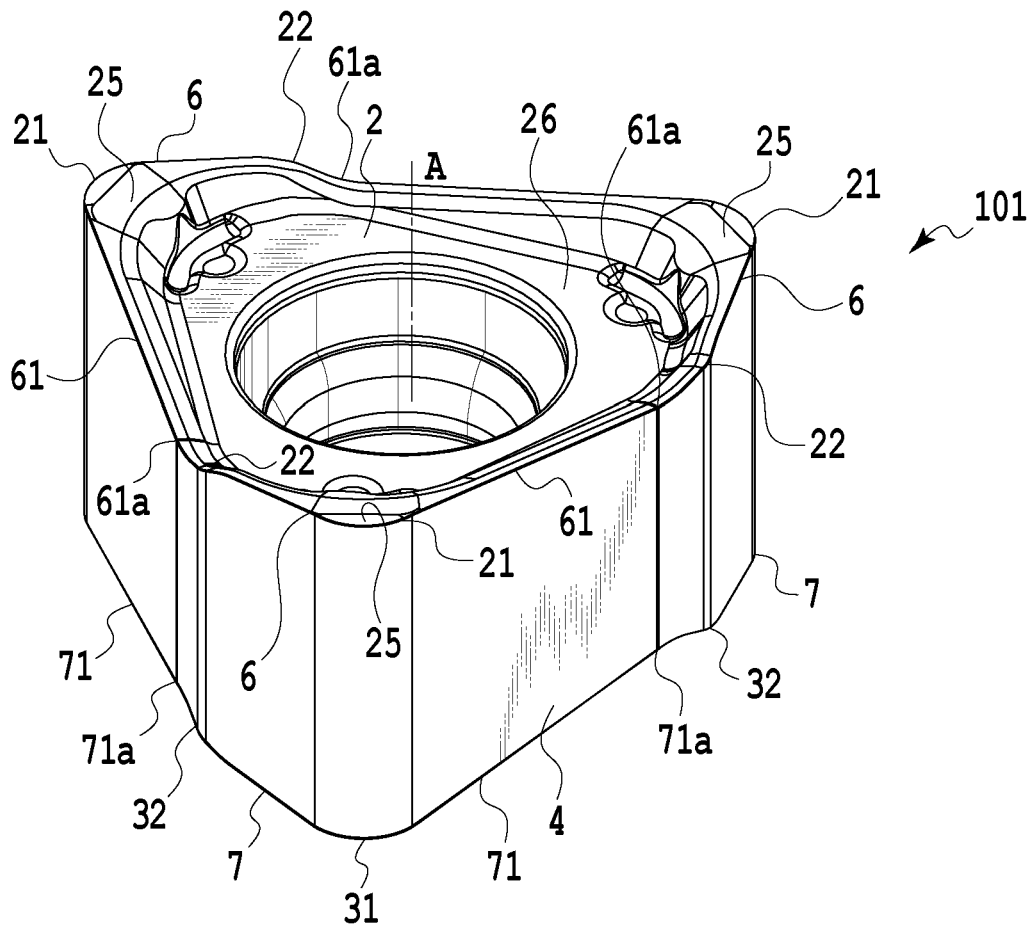
FIG. 10 is a perspective view of a cutting insert according to a third embodiment in the present invention.

Each of the first corners 21 and 31 is formed to be curved in a constant curvature radius. The curvature radius of each of the first corners 21 and 31 can be altered appropriately matching a size of a curve provided in the corner portion of the groove to be processed. For example, the curvature radius of the first corner 21 can be made large as a cutting insert 1A according to a second embodiment in the present invention as shown in FIG. 9, and the curvature radius of the first corner 21 in the cutting insert 1A is 2.4 mm, for example. It should be noted that the cutting insert 1A in the second embodiment differs in a point of the curvature of the first corner 21 of the upper surface side and the curvature of the first corner of the lower surface side (not shown) from the cutting insert 1 in the first embodiment, but is approximately similar to the cutting insert 1 in regard to the other configurations. Therefore, a further explanation of the cutting insert 1A in the second embodiment will be omitted.

Since the cutting insert 1 in the first embodiment is formed to have a substantially hexagonal contour as described above in a planar view, the three corners (first corners 21), that is, the three cutting edge portions 6 in the upper surface 2 can be used for cutting, and the three corners (first corners 31), that is, the three cutting edge portions 7 in the lower surface 3 can be used for cutting. That is, six corners, that is, six cutting edge portions in a combination of the upper and lower surfaces can be used for cutting.

An explanation will be further made of the cutting edge portions 6 and 7. As defined above, the median plane M is a plane that is perpendicular to the axis A, and bisects the cutting insert 1, and is shown in FIG. 3. In a side view of the cutting insert 1 in FIG. 3, the median plane M is illustrated as a straight line (reference line) that is drawn to pass through a central position between the upper surface 2 and the lower surface 3 and be perpendicular to the axis A (not shown in FIG. 3) of the cutting insert 1.

In the side view of the cutting insert 1, each cutting edge portion 6 is formed in such a manner that a distance between each cutting edge portion 6 and the median plane M is maximized at an apex portion 21a of the first corner (cutting corner) 21, and is made gradually shorter as a distance from the apex portion 21a of the first corner 21 is increased. That is, the major cutting edge 61 is inclined in such a manner as to be the most away from the median plane M at the first corner side end portion, and to be the closest to the median plane M at the second corner side end portion. The minor cutting edge 62 is inclined in such a manner as to be the most away from the median plane M at the first corner side end portion, and to be the closest to the median plane M at the second corner side end portion. In addition, the major cutting edge 61 of the cutting edge portion 6 is connected to the minor cutting edge 62 of the cutting edge portion 6 adjacent thereto in a major cutting edge side end portion of the cutting edge portion 6 that is the closest to the median plane M in the cutting edge portion 6, that is, in the second corner 22. In this way, in the cutting insert 1 in the first embodiment, each cutting edge portion 6 is closer to the median plane M as a distance from the first corner 21 is increased, and the cutting edge portion 6 as a whole has an inclination such that the cutting edge portion 6 is the closest to the median plane M in the second corner 22, particularly at the end portion of the major cutting edge 61-side.

In the cutting insert 1 in the first embodiment, the inclination angle of the cutting edge portion 6 to the median plane M is preferably in a range from three degrees to ten degrees inclusive. Modifications of the cutting insert 1 may include various kinds of cutting inserts in which each of the cutting edges 61, 62 and 63 in the single cutting edge portion 6 is formed so as to be closer to the median plane M as a distance from the first corner 21 is increased and be the closest to the median plane M in the second corner 22, and in each of these cutting inserts, the inclination shape of each of the major cutting edge 61 and the minor cutting edge 62 may not be straight, but may be curved. Further, the inclination angle of this cutting edge may not be regularly a constant angle, or may change in the midway section of the cutting edge.

The cutting edge portion 7 of the lower surface 3-side has the same characteristics with the cutting edge portion 6 of the upper surface 2-side, and is inclined to the median plane M as a whole. A major cutting edge 71 of the cutting edge portion 7 is formed to be inclined by a predetermined angle in such a manner as to be closer to the median plane M as a distance from the first corner 31, that is, a corner cutting edge 73 is increased. In addition, a minor cutting edge 72 is formed to be inclined by a predetermined angle in such a manner as to be closer to the median plane M as a distance from the corner cutting edge 73 is increased. Since the major cutting edge 71 is longer than the minor cutting edge 72, each cutting edge portion 7 is the closest to the median plane M in the second corner 32, particularly in the end portion of the major cutting edge 71-side.

Figure 4:
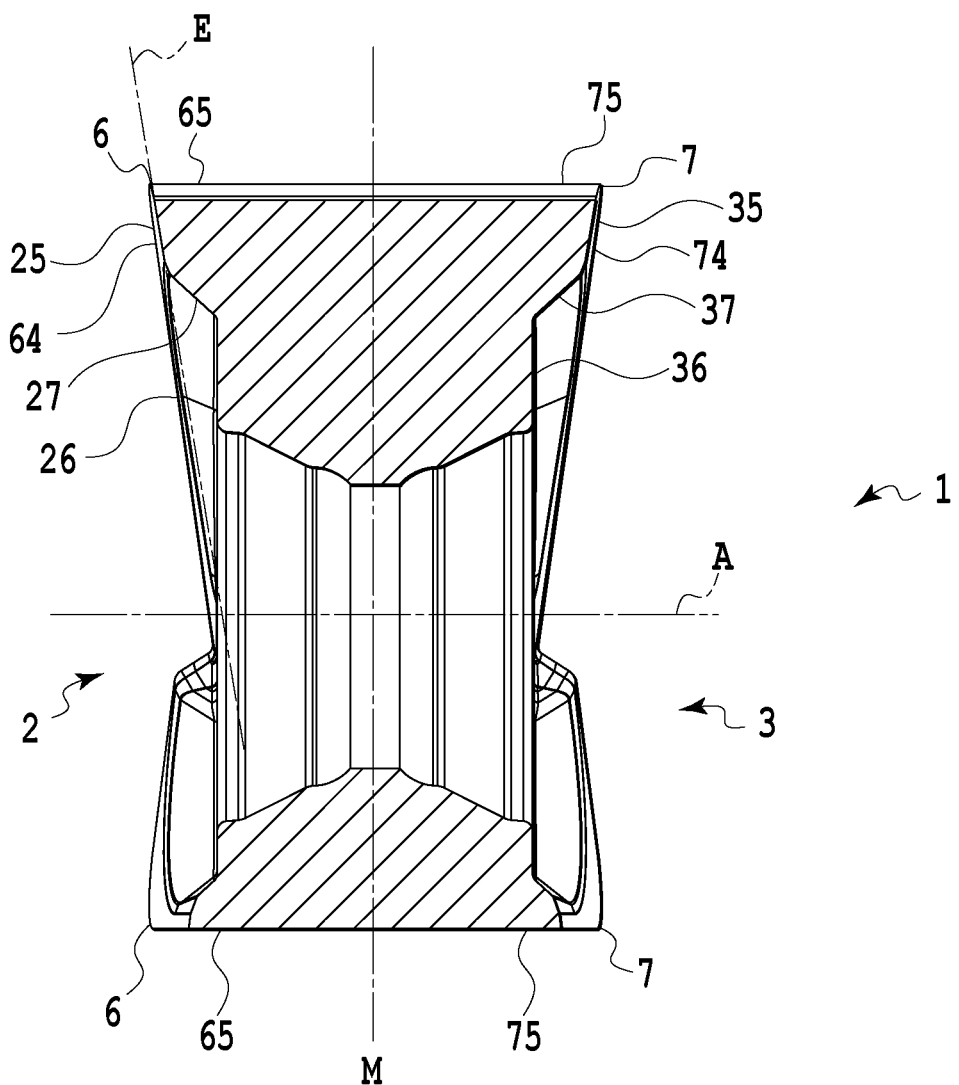
FIG. 4 is a cross section taken along line IV-IV of the cutting insert in FIG. 2.

As shown in FIG. 1, the upper surface 2 is provided with an outside end face portion 25 and an inside end face portion 26 positioned closer to the inside than the outside end face portion 25, that is, near the axis A. The outside end face portion 25 is provided adjacent to the corresponding or related cutting edge portion 6, and the upper surface 2 is provided with the three outside end face portions 25. However, the three outside end face portions 25 may be formed to be continuous to be configured as one outside end face portion. The inside end face portion 26 is formed in a ring shape to extend in the periphery of the mounting hole 5. The inside end face portion 26 is formed closer to the median plane M than the outside end face portion 25, and is formed substantially in parallel to the median plane M particularly as shown in FIG. 4 in the cutting insert 1. Further, the upper surface 2 is provided with three step faces 27 that connect the three outside end face portions 25 and the one inside end face portion 26. Each of the step faces 27 connects the outside end face portion 25 and the inside end face portion 26 adjacent thereto, and may be called a connecting surface. The outside end face portion 25, the inside end face portion 26 and the step face 27 form a recess on the upper surface 2.

The outside end face portion 25 is formed to act as a rake face 64 of the cutting edge portion 6, and a surface formed along the major cutting edge 61, the minor cutting edge 62 and the corner cutting edge 63 of the cutting edge portion 6 adjacent thereto. In the first embodiment, the outside end face portion 25 is formed in such a manner as to be inclined toward the lower surface 3-side, that is, closer to the median plane M (refer to FIG. 4), as it is closer to the inside of the cutting insert 1. In addition, the outside end face portion 25 is formed such that a width of the outside end face portion 25 near the first corner 21 is made the largest, but can change as needed.

In addition, the outside end face portion 25 is substantially configured as a single plane. The cutting edge portion 6 and the outside end face portion 25 are formed such that a substantially entire part of the cutting edge portion 6 adjacent thereto extends on a smooth extension plane of the outside end face portion 25. Since on the basis that they are configured as mentioned above the cutting edges 61, 62 and 63 in the single cutting edge portion 6 are regularly present on the same plane, a height of the corner cutting edge 63 in the cutting edge portion 6 smoothly changes. Therefore, even if a magnitude of the curvature radius of the first corner 21 is changed variously, it is possible to maintain the corner cutting edge shape with high accuracy. Further, according to this configuration, also in a case where the curvature of the first corner 21 is made large, since a rake angle in the periphery of the corner cutting edge 63 does not change, it is possible to maintain the cutting edge strength to more than some degrees. It should be noted that the outside end face portion 25 is not limited to being provided in this way, and may be formed with a single curved plane, not with the single plane. In addition, on the smooth extension plane of the outside end face portion 25 provided as the single plane or the single curved plane the entire cutting edge portion adjacent thereto does not necessarily extend, and at least more than half thereof preferably extends.

Next, the inside end face portion 26, as described above, is a plane formed in a position closer to the median plane M than the outside end face portion 25. The inside end face portion 26, at the time of attaching the cutting insert 1 to a tool body 81 as a side cutter body, is a plane that becomes in an abutment state against a bottom wall surface of the insert attaching seat in the tool body 81. The inside end face portion 26 is herein a flat plane, but, not limited thereto, may be formed in a curved shape or be formed to have a concave-convex shape.

The step face 27, as described above, is the face formed to connect the inside end face portion 26 and the outside end face portion 26. The step face 27 is inclined to be similar to the outside end face portion 25, but is inclined in an angle larger than the inclination angle of the outside end face portion 25 to the median plane M. The step face 27 may be formed of a plane or a curved face.

The configuration that the outside and inside end face portions 25 and 26 are directly connected without use of the step face 27 is possible, but preferably the step face 27 is provided. Chips generated by the cutting of each cutting edge in the cutting edge portion 6 make contact with the outside end face portion 25 as the rake face adjacent to the cutting edge portion 6, making it possible for the chips to flow backward as they are. Particularly in the cutting insert 1, the outside end face portion 25 is non-continuous with the inside end face portion 26, and is inclined with a predetermined inclination to the inside end face portion 26 and the median plane M. The predetermined inclination of the outside end face portion 25 relates to the inclination of the cutting edge portion 6, and herein, is particularly defined such that chips generated by the cutting by the related cutting edge portion 6 do not make contact with the inside end face portion 26. Specifically as can be understood from FIGS. 1, 2 and 4, particularly as shown in FIG. 4, the outside end face portion 25 is formed to be inclined to the inside end face portion 26 and the median plane M such that the extension plane (line E illustrated by simplification in FIG. 4) of the outside end face portion 25 reaches the axis A without intersecting with a section of the inside end face portion 26 between the outside end face portion 25 and the mounting hole 5. Therefore, according to this configuration, it is possible to restrict such chips from making contact with the inside end face portion 26. That is, since a certain distance between the outside end face portion 25 and the inside end face portion 26 is maintained, chips slide on the outside end face portion 25 as the rake face, and can be separated from the cutting insert 1 without making contact with the inside end face portion 26. Therefore, it is possible to prevent damages of the inside end face portion 26 due to contact of chips therewith. In the cutting insert 1 both surfaces of which are used for cutting, since the inside end face portion 26 acts as the seat surface as described above, the fixation of the cutting insert 1 to the tool body 81 possibly deteriorates when the inside end face portion 26 becomes rough, but the cutting insert 1 can eliminate this problem.

The lower surface 3 also, as similar to the upper surface 2, includes outside end face portions 35, an inside end face portion 36 and a step face 37, which form a recess on the lower surface 3. The outside end face portion 35, the inside end face portion 36 and the step face 37 of the lower surface 3 correspond to the outside end face portion 25, the inside end face portion 26 and the step face 27 of the upper surface 2 respectively, and similarly have the aforementioned characteristics in regard thereto, allowing the similar alternation.

The cutting insert 1 in the first embodiment can be made of various kinds of materials and have various coatings thereon. The cutting insert 1 is preferably made of a hard material such as a cemented carbide, coated cemented carbide, cermet, ceramics or an ultrahigh pressure sintered body containing diamond or cubic boron nitride.

Next, an explanation will be made of the rotary cutting tool 8 in the first embodiment in which the cutting inserts 1 in the first embodiment as described above are mounted, that is, the side cutter 8 with reference to FIG. 5 to FIG. 8.

Figure 5:
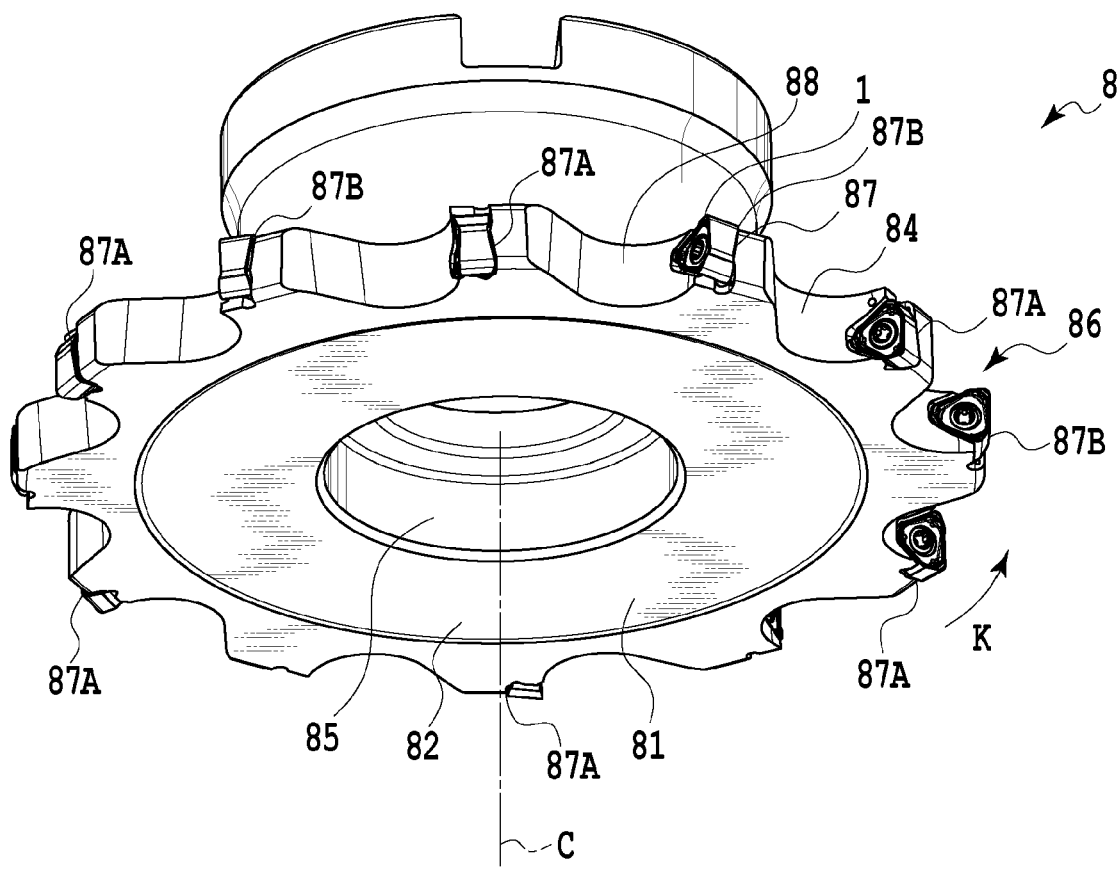
FIG. 5 is a perspective view of a cutting tool according to the first embodiment in the present invention, to which the cutting insert in FIG. 1 is attached.
Figure 6:
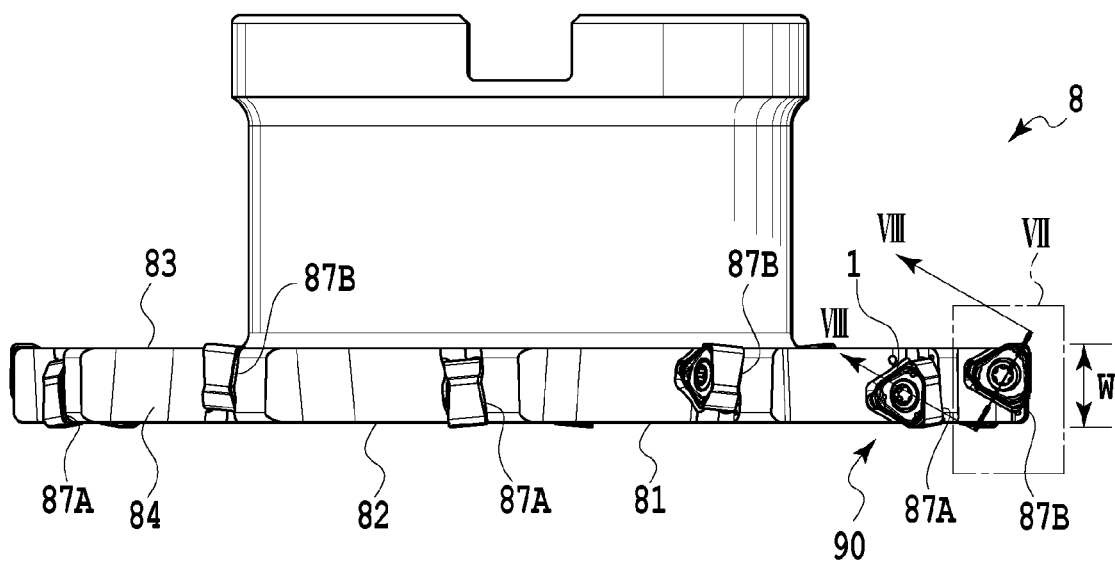
FIG. 6 is a plan view of the cutting tool in FIG. 5.

The side cutter 8 in which the cutting inserts 1 are mounted is shown in FIG. 5 and FIG. 6. A tool body 81 is provided with two substantially circular tool body end surfaces (hereinafter, body end surfaces) 82 and 83 that are positioned at the opposite side to each other, an outer peripheral surface 84 connecting the two body end surfaces 82 and 83, and a bore hole 85 penetrating through the center of the two body end surfaces 82 and 83. The side cutter 8, that is, the tool body 81 is used to rotate around the rotary axis C defined to extend to the center of the bore hole 85. It should be noted that herein since the cutting edge portion 6 in the upper surface side, as described above, corresponds to a first cutting edge portion in the present invention, and the cutting edge portion 7 in the lower surface side corresponds to a second cutting edge portion in the present invention, one body end surface 82 corresponds to a first body end surface, and the other body end surface 83 corresponds to a second body end surface.

An outer peripheral portion 86 of the tool body 81, particularly the outer peripheral surface 84 thereof is provided with a plurality of insert attaching seats 87 and a plurality of chip pockets 88 each adjacent to the corresponding insert attaching seats 87. The chip pocket 88 is provided for discharging chips. The insert attaching seat 87 is provided to be adjacent to the backward side of the adjacent chip pocket 88 in the tool rotation direction K.

The plurality of the insert attaching seats 87, each of which is configured such that the cutting insert 1 can be removably attached thereto, consist of first insert attaching seats 87A each of which opens to the first body end surface 82 that is one of the two body end surfaces 82 and 83, and second insert attaching seats 87B each of which opens to the second body end surface 83 that is the other of the two body end surfaces 82 and 83. In the tool body 81, the first insert attaching seats 87A and the second insert attaching seats 87B are alternately disposed in a staggered configuration. It should be noted that in the tool body 81, a circumferential interval between the first insert attaching seat 87A and the second insert attaching seat 87B adjacent thereto is made constant.

Figure 7:
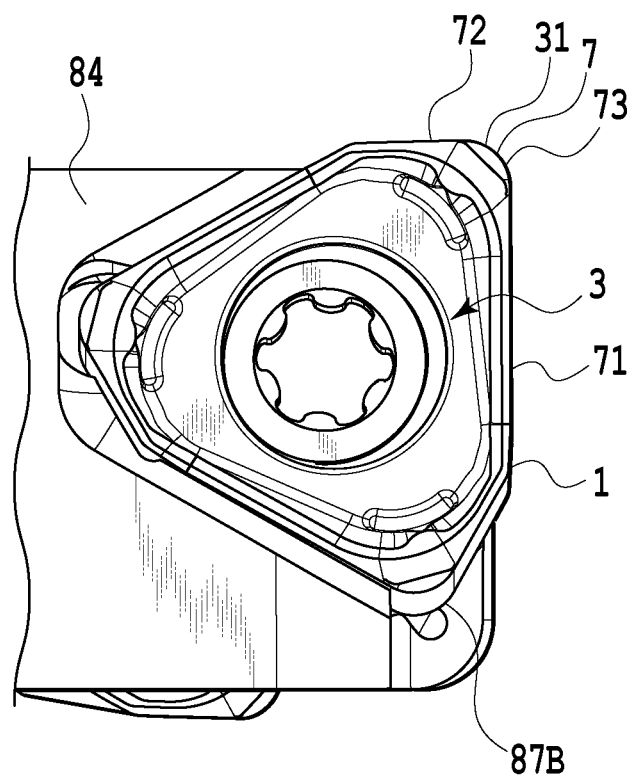
FIG. 7 is a partially enlarged view of a VII part of the cutting tool in FIG. 6.

The cutting insert 1 is removably attached to each of the first insert attaching seats 87A and the second insert attaching seats 87B such that minor cutting edge 62 or 72 in use protrudes in the rotation axis C and the major cutting edge 61 or 71 in use protrudes in a direction at a right angle to the rotation axis (refer to FIGS. 6 and 7). The plurality of the cutting inserts 1 are attached to the first insert attaching seats 87A and the second insert attaching seats 87B in a flatly placing manner such that each thereof protrudes from any of the body end surfaces 82 and 83, the major cutting edge 61 or 71 in use protrudes from the outer peripheral surface 84, and the corner cutting edge 63 or 73 of the first corner 21 and 31 as an usable cutting corner protrudes from a region connecting the body end surface and the outer peripheral surface. In addition, the plurality of the cutting inserts 1 are attached such that a rotation trace of the major cutting edge 61 of the cutting insert 1 attached to the first body end surface 82 and a rotation trace of the major cutting edge 71 of the cutting insert 1 attached to the second body end surface 83 overlap to each other.

Figure 8:
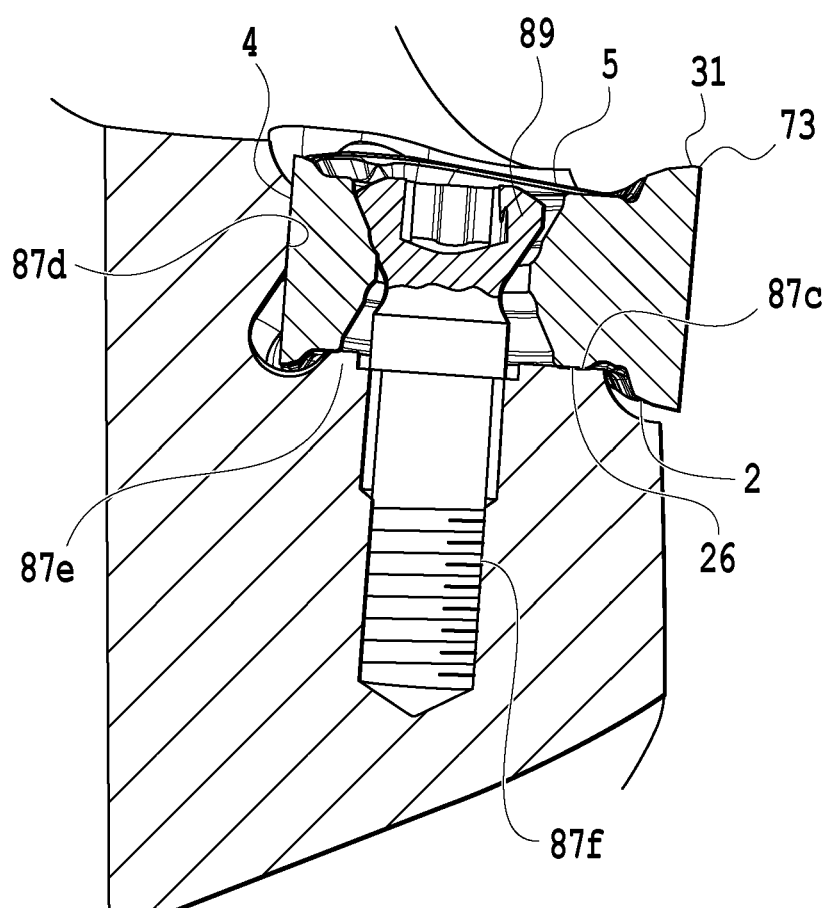
FIG. 8 is a cross section taken along line VIII-VIII of the cutting tool in FIG. 6.

It should be noted that each of the insert attaching seats 87 (87A and 87B) includes a bottom wall surface 87c and a side wall surface 87d. When the cutting insert 1 is attached on the insert attaching seat 87, first, an end surface (the upper surface 2 in FIG. 8) of the cutting insert 1 that has no involvement in the cutting edge portion in use abuts against the bottom wall surface 87c as a seat surface, and the peripheral side surface 4 abuts against the side wall surface 87d. At this time, as shown in FIG. 8 a protrusion portion 87e provided in the bottom wall surface 87c enters into the recess of the cutting insert 1 and abuts against the inside end face portion 26. In a state where the cutting insert 1 is thus disposed on the insert attaching seat 87, an attachment screw 89 is screwed through the mounting hole 5 of the cutting insert 1 into a screw hole 87f of the bottom wall surface 87c. Thereby, the cutting insert 1 is removably attached on the insert attaching seat 87.

In this way, the cutting tool 8, that is, the side cutter 8 in which the plurality of the cutting inserts 1 are mounted is rotated around the rotation axis C to be used for processing grooves to a workpiece. The first corners 21 and 31 of the cutting insert 1 act as cutting corners, and the usable corner cutting edges 63 and 73 formed therein are involved in cutting the corner portion of the groove. In addition, the usable major cutting edges 61 and 71 of the cutting insert 1 are involved in cutting the bottom portion of the groove, and the usable minor cutting edges 62 and 72 are involved in cutting the side wall portion of the groove.

The cutting insert 1 is, as can be understood from FIG. 6 and FIG. 7, configured such that the usable major cutting edges 61 and 71 are disposed substantially in parallel to the rotation axis C of the cutting tool 81. In addition, the contour of each of the upper and lower surfaces in the cutting insert 1 is configured such that first side portions 23 and 33 between the first and second corners between which the major cutting edge extends and second side portions 24 and 34 between the first and second corners that are respectively shorter than the first side portions 23 and 33 and between which the minor cutting edge extends are alternately adjacent to each other. Therefore, in the cutting tool 8 in which the cutting insert 1 is disposed in the tool body 81, the width of the rotation trace of the cutting insert 1 is narrow with respect to a size of the cutting insert 1. Thereby, also in the cutting insert 8 in which the plurality of the cutting inserts 1 are disposed such that the respective rotation traces of the major cutting edges overlap to each other, a width W of a cutting part 90 thereof can be made relatively short. Therefore, the cutting insert 1 can be adapted for processing grooves having various widths.

As described above, the cutting edge portions 6 and 7 are formed to be inclined in such a manner as to be the most away from the median plane M at the corner cutting edges 63 and 73 and be gradually closer to the median plane M as a distance from the corner cutting edges 63 and 73 along the major cutting edges 61 and 71 or the minor cutting edges 62 and 72 is increased. This inclination is given to each of the cutting edge portions 6 and 7, which enables the outflow direction of chips to be controlled to the tool body direction. It should be noted that the above inclination of each of the outside end face portions 25 and 26 can contribute to controlling the outflow direction of chips. That is, the generated chip is guided in the direction of being away from the cutting corners 21 and 31 (that is, the tool body side) due to the inclination of the use cutting edge portions 6 and 7, and the like. Controlling thus the chips generated near the cutting corners 21 and 31 to flow in the direction of being away from the groove wall enables a possibility that the chip damages the groove wall to be greatly reduced. Since the processing space is very narrow in the groove processing, there is a possibility that the chip damages the groove wall to deteriorate the surface roughness, but by controlling the outflow direction of chips as in the case of the first embodiment, it is possible to solve this problem. In addition, the reason that it is preferable that the inclination angle of the cutting edge to the median plane M is in a range from three degrees to ten degrees inclusive is that when the inclination angle smaller than three degrees, the effect of guiding chips is small, and when the inclination angle is larger than ten degrees, a possibility that chips are carried to the groove wall at the opposite is made large.

As described above, the cutting insert 1 and the cutting tool 8 according to the first embodiment in the present invention are explained, but various kinds of changes are allowable thereto. For example, in the cutting insert 1 of the first embodiment, the major cutting edge 61 or 71 and the minor cutting edge 62 or 72 in each of the cutting edge portions 6 and 7 is inclined to be closer to the median plane M as a distance from the corner cutting edge 63 or 73 as a whole is increased. However, the entirety of each of the cutting edges 61, 62, 71 and 72 is not limited to being inclined, and each may have partially an inclined part closer to the median plane as a distance from the corner cutting edge is increased to control the outflow direction of chips as described above.

In addition, the interval between the insert attaching seat 87A and the insert attaching seat 87B adjacent to each other in the circumferential direction in the tool body 81 may be not constant. Specifically the circumferential interval between the first insert attaching seat 87A and the second insert attaching seat 87B adjacent to the first insert attaching seat 87A in the forward side in the rotation direction thereof may differ from the circumferential interval between the first insert attaching seat 87A and the second insert attaching seat 87B adjacent to the first insert attaching seat 87A in the backward side in the rotation direction thereof.

Next, an explanation will be made of a cutting insert 101 according to a third embodiment in the present invention with reference to FIG. 10 to FIG. 13. In the following, however, differences of the cutting insert 101 from the cutting insert 1 in the first embodiment as described above will be explained. In the following explanation and figures, components identical to those already explained will be referred to as identical codes, and an overlap explanation thereof will be omitted.

Figure 12:
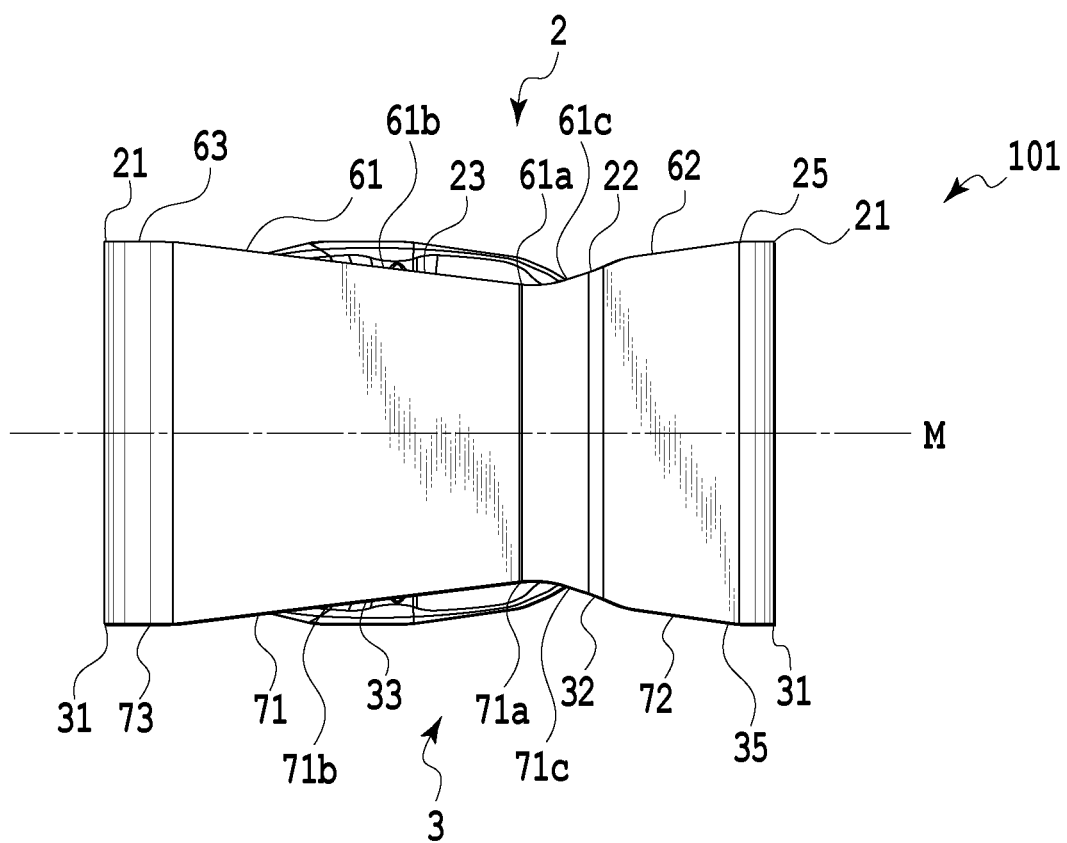
FIG. 12 is a side view of the cutting insert according to the third embodiment in the present invention.

Also in the cutting insert 101 in the third embodiment, three cutting edge portions 6 or 7 are provided in the intersection ridge portions between each of an end surfaces 2 and 3, and a peripheral side surface 4 as similar to the above cutting insert 1 in the first embodiment, and corner cutting edges 63 and 73 of the respective cutting insert portions 6 and 7 extend substantially in parallel to a median plane M. As shown in FIG. 12, first corners 21 and 31 extend substantially in parallel to the median plane M. That is, in the cutting insert 101, an inclination of each of the corner cutting edges 63 and 73 to the median plane M is set to substantially zero, and only each of major cutting edges 61 and 71 and minor cutting edges 62 and 72 is set to a predetermined inclination of some degrees to the median plane M. It should be noted that an inclination of a part of each of the major cutting edges 61 and 71 and an inclination of each of the minor cutting edges 62 and 72 is the same as that of each of the major cutting edge and the minor cutting edge in the first embodiment. With adoption of such a configuration, it is possible to greatly improve strength of each of the cutting corners 21 and 31 to which the maximum load may be applied at the cutting. That is, with this configuration, it is possible to more appropriately prevent damages of the cutting corners 21 and 31 while controlling or guiding the generated chips as described above.

In addition, in the cutting insert 101, as shown in FIG. 12, a distance between each of the cutting edge portions 6 and 7 and the median plane M is the shortest, not in the connecting portion between the adjacent cutting edge portions (that is, second corner 22 or 32), but in each of first side portions 23 and 33 away from each of the second corners 22 and 32, that is, in a section (the closest section) 61a or 71a positioned in each of the major cutting edges 61 and 71. With adoption of this configuration, two sections 61b and 61c and two sections 71b and 71c, the two sections having reverse inclinations, are present in each of the major cutting edges 61 and 71. In a side view in FIG. 12, the inclination of one first corner side inclined section 61b in the major cutting edge 61 to the median plane M is in reverse to the inclination of the other second corner side inclined section 61c in the major cutting edge 61 to the median plane M, and the same is true also of the major cutting edge 71. Therefore, chips are subjected to such a force as to be curved in the width direction by the cutting by the major cutting edge. Therefore, the curved chips are generated. Such a curved chip tends to be easily guided since the chip tends to be easily split up to be small. This curved chip is not entangled in the tool since this chip is small and round, and easy to be treated. Since one of the problems in the groove processing is for chips to stay in a narrow space inside the groove, this configuration has a great advantage.

Figure 13:
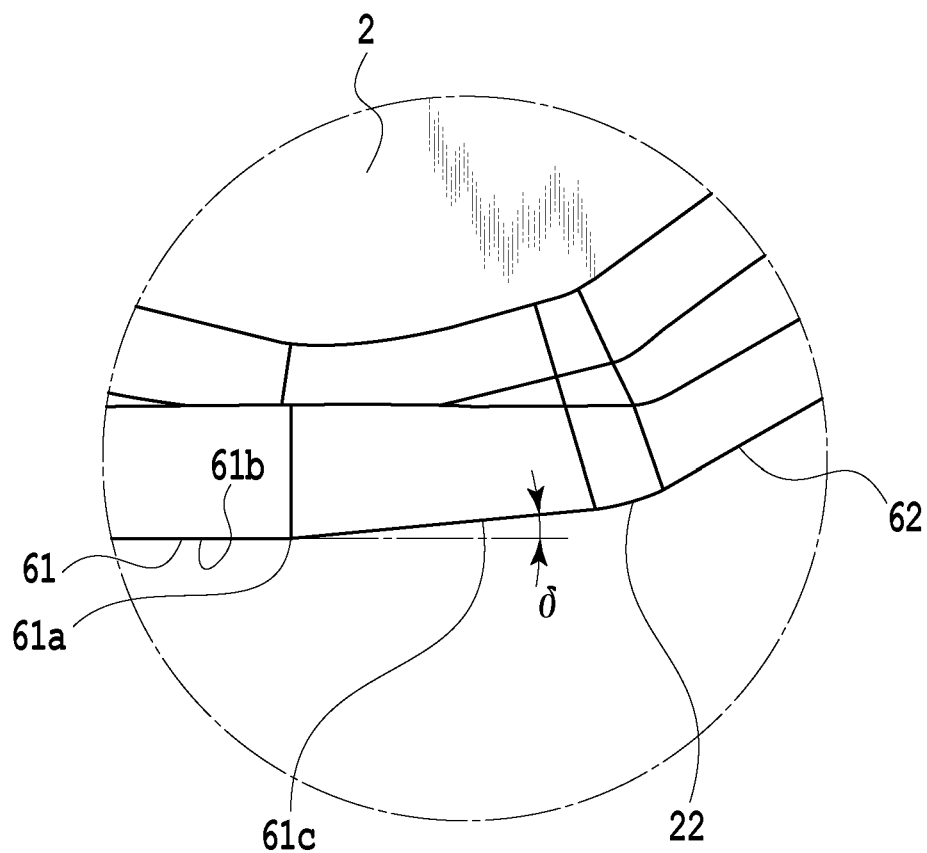
FIG. 13 is a partially enlarged view of an XIII part of the cutting insert in FIG. 11.

Further, in the cutting insert 101, each of the closest sections 61a and 71a of the cutting edge portions 6 and 7 to the median plane M, as shown in a partially enlarged view in FIG. 13 (the section 71a is not shown in FIG. 13), protrudes to the outward side of the cutting insert 101 in a plane view, in which the major cutting edge 61 is formed to be bent. That is, the major cutting edge 61 in the cutting edge portion 6 includes the first corner-side inclined section 61b connected to the first corner 21, and the second corner-side inclined section 61c one end of which is connected to the first corner-side inclined section 61b and the other of which is connected to the minor cutting edge 62 of the cutting edge portion 6 adjacent thereto, and is formed in a convex shape by a difference in inclination (angle 8 in FIG. 13) between the first corner-side inclined section 61b and the second corner-side inclined section 61c in a plane view. The cutting edge portion 7 in the lower surface 3-side is also configured to be similar to the cutting edge portion 6, and includes a first corner-side inclined section 71b corresponding to the first corner-side inclined section 61b, and a second corner-side inclined section 71c corresponding to the second corner-side inclined section 61c.

As described above, in a case of simply providing the closest portions 61a and 71a to the median plane M in the cutting edge portions 6 and 7 to the major cutting edges 61 and 71 alone, each rotation trace of the major cutting edges 61 and 71 in the cutting tool is formed in a concave shape. Therefore, when this configuration is only applied to the major cutting edge, the step tends to be easily generated on a machined surface of a workpiece, that is, a groove bottom surface. However, by forming the major cutting edges 61 and 71 in such a manner as to protrude in the closest sections 61a and 71a in a plane view in addition to providing the closest portions 61a and 71a with the major cutting edges 61 and 71, the rotation trace of each of the major cutting edges 61 and 71 can be formed in a smooth cylindrical shape or can be formed to be close thereto. Therefore, the groove processing by the side cutter in which the cutting insert 101 are attached can restrain steps from being generated in a groove bottom surface, thereby making it possible for the groove bottom surface to be substantially flat. The major cutting edges 61 and 71 in the cutting insert 101 having this configuration can improve the flatness of the machined surface.

Figure 11:
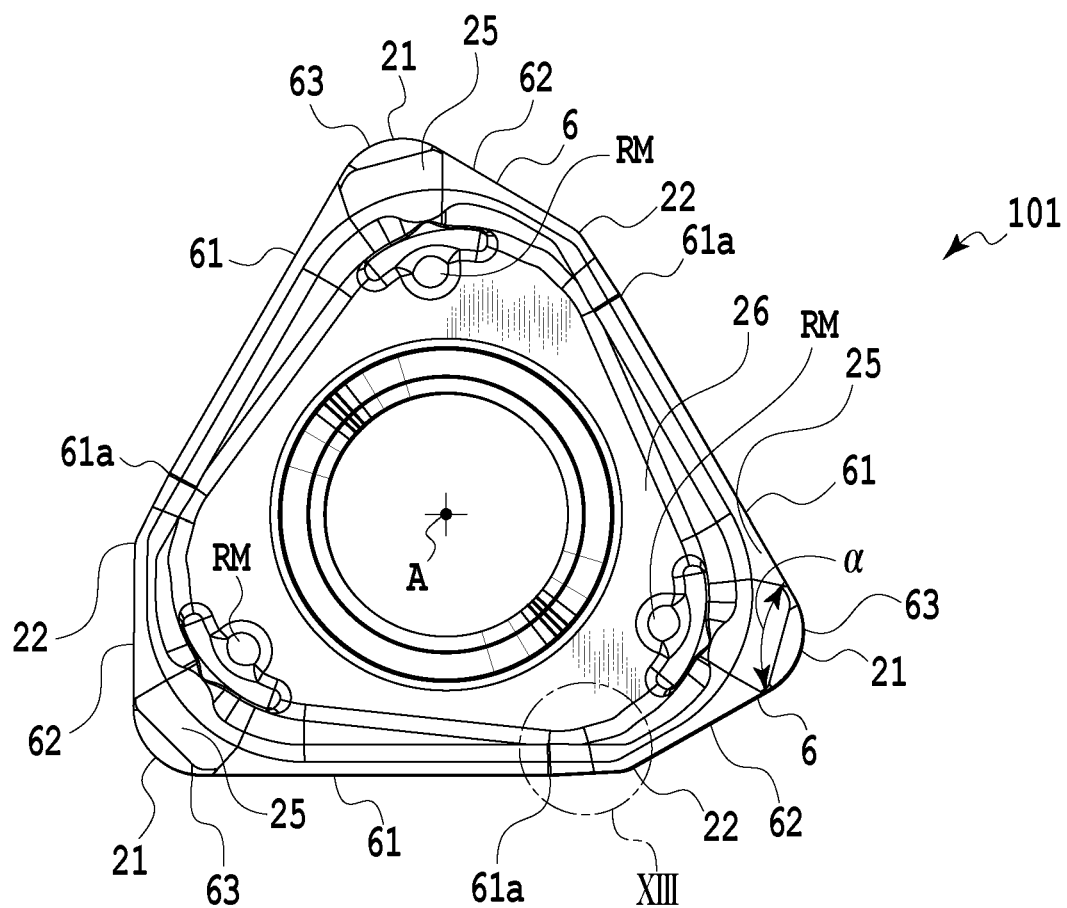
FIG. 11 is a plan view of the cutting insert according to the third embodiment in the present invention.

Further, in the cutting insert 101, a first corner inner angle α of the first corner 21 as the cutting corner is made an obtuse angle (refer to FIG. 11). Therefore, it is possible to provide a flat cutting edge with each of the minor cutting edges 62 and 72. The surface roughness of the groove wall surface can be improved by providing the flat cutting edge. This flat cutting edge may be straight or curved.

In addition, in the cutting insert 101, as compared to the cutting insert 1 in the first embodiment, the outside end face portions 25 and 35 extending adjacent to the first corners 21 and 31 are formed to protrude widely in the width direction toward the axis A-side (refer to FIG. 11). Therefore, an area of the rake face in each of the cutting edge portions 6 and 7 increases. This increases an influence of the rake face on chips, which can more appropriately restrict the chip from making contact with the inside end face portion as the seat surface or the other cutting edge portion not in use. It should be noted that each of the outside end face portions 25 and 35 in the cutting insert 101 is configured with a plurality of surface sections each having an inclination adapted for a section of the adjacent cutting edge since each of the cutting edge portions 6 and 7 has the aforementioned configuration. However, each of the outside end face portions 25 and 35 in the cutting insert 101 may be configured substantially as a single curved surface.

Further, in the cutting insert 101, a recognition mark RM is provided on a section of the inside end face portion 26 near the cutting corner 21. This recognition mark RM differs in pattern between the upper surface 2 and the lower surface 3 (the mark on the lower surface 3 is not illustrated).

It should be noted that the cutting insert 101 in the third embodiment is, as similar to the cutting insert 1 in the first embodiment, removably attached on the insert attaching seat of the tool body in the side cutter, and is used for processing grooves. It should be noted that an explanation of the side cutter as the rotary cutting tool in the third embodiment will be omitted.

Figure 14:
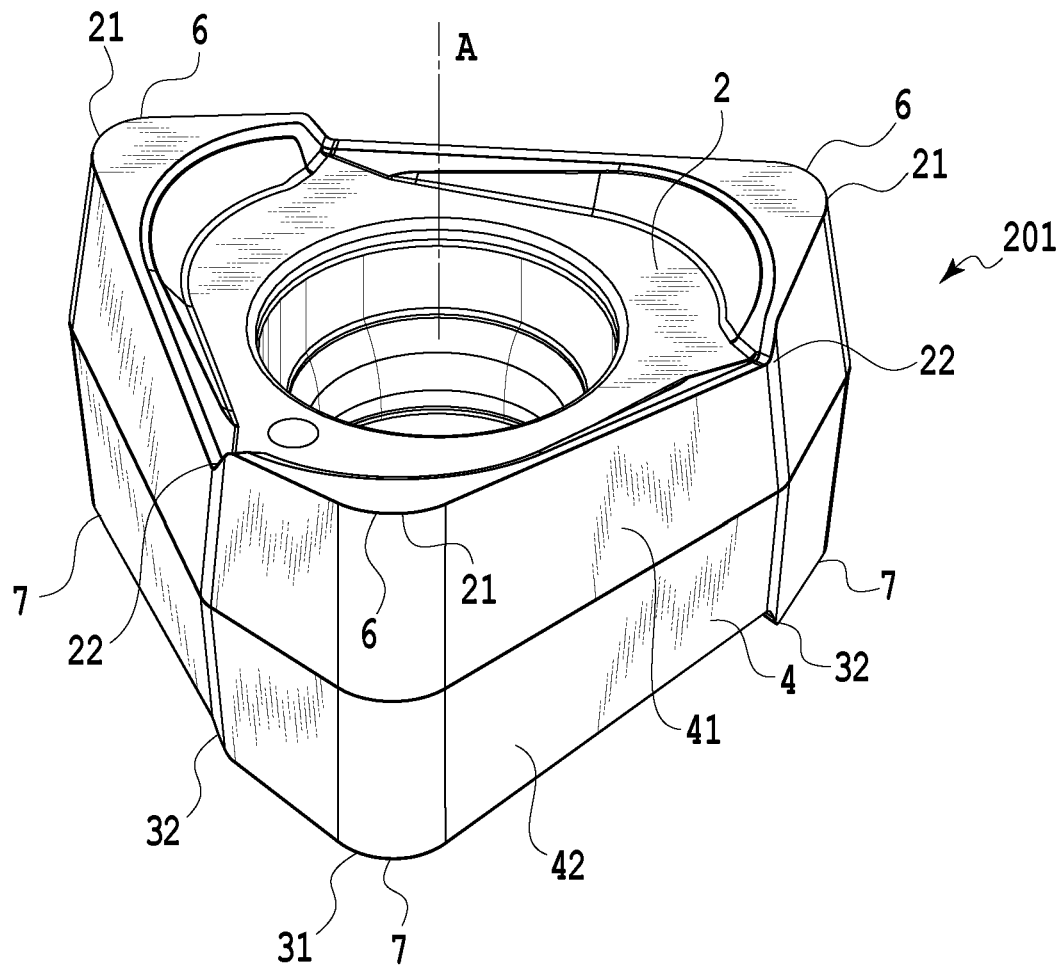
FIG. 14 is a perspective view of a cutting insert according to a fourth embodiment in the present invention.
Figure 15:
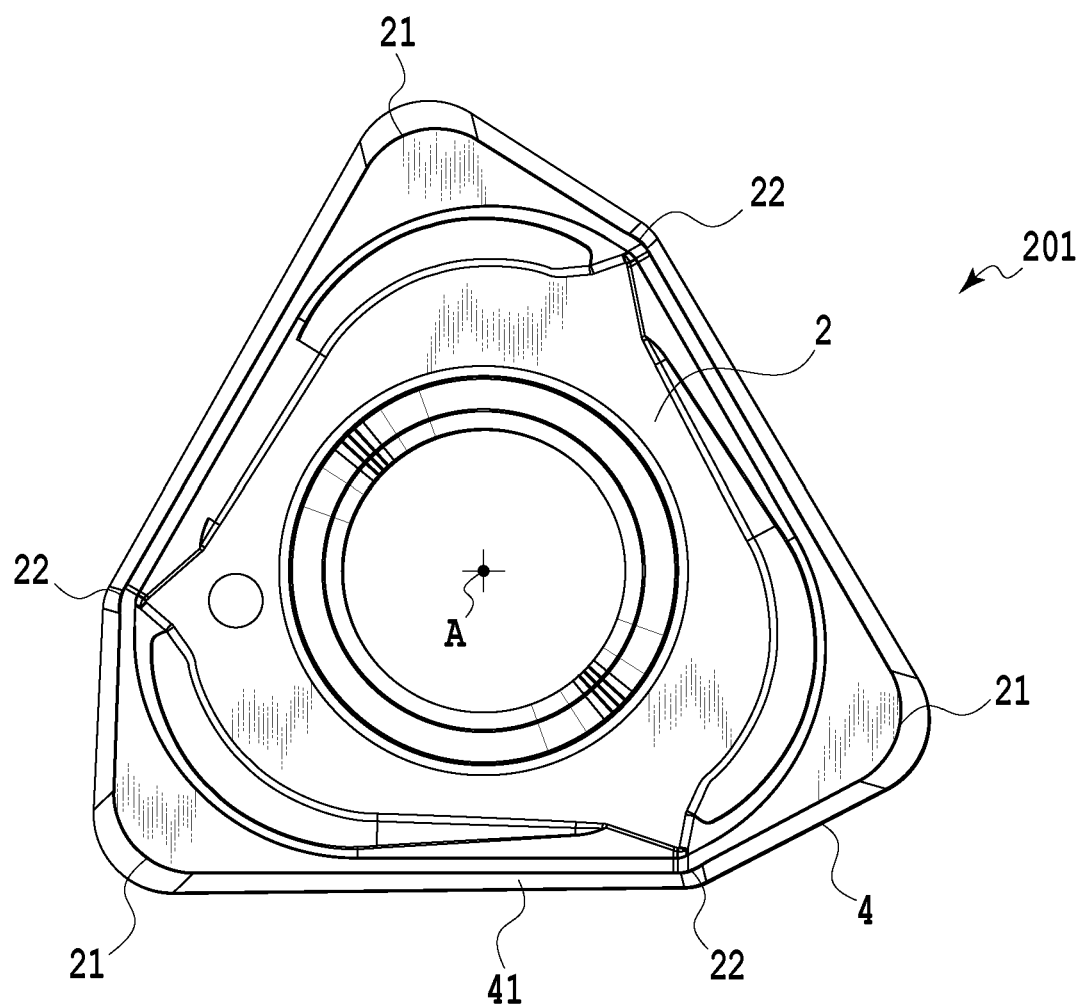
FIG. 15 is a plan view of the cutting insert according to the fourth embodiment in the present invention.
Figure 16:
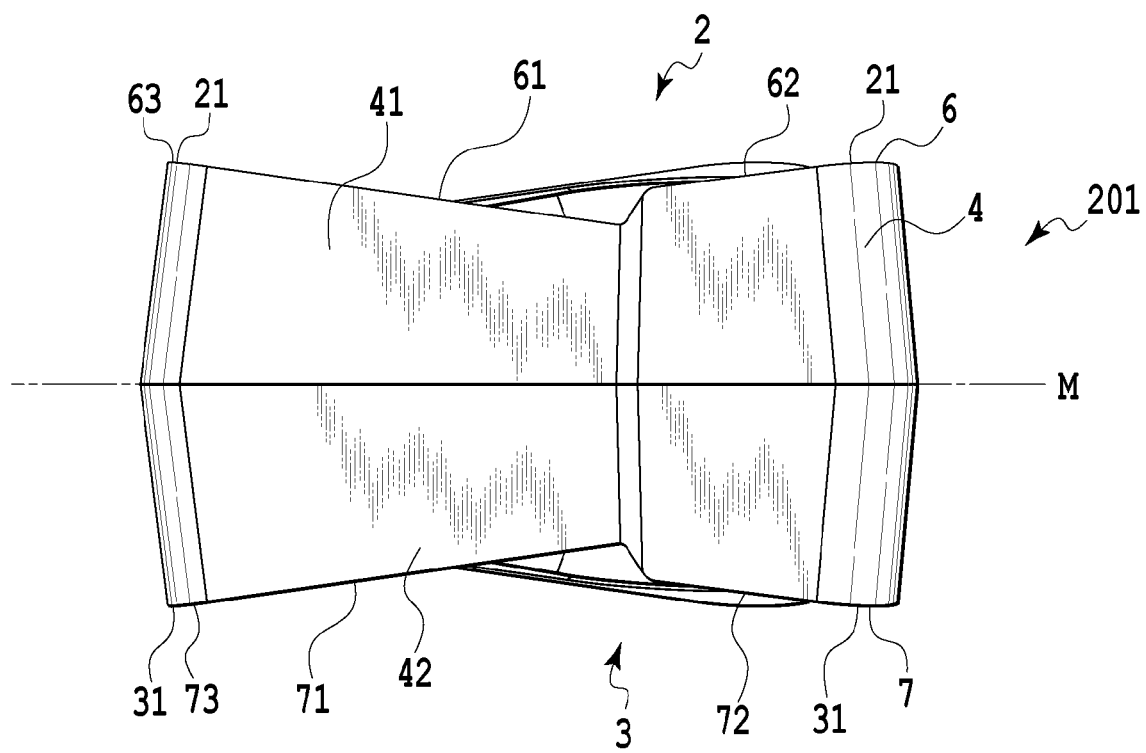
FIG. 16 is a side view of the cutting insert according to the fourth embodiment in the present invention.

Next, an explanation will be made of a cutting insert 201 according to a fourth embodiment in the present invention with reference to FIG. 14 to FIG. 16. In the following, however, characteristic differences of the cutting insert 201 from the cutting insert 1 in the first embodiment as described above will be explained. In the following explanation and figures, components identical to those already explained will be referred to as identical codes, and an overlap explanation thereof will be omitted.

As can be understood from the figures, a peripheral side surface 4 acting as the flank face is configured to protrude outward and is formed in a substantially barreled shape. The peripheral side surface 4 is divided into an upper side face section 41 connected to an upper surface 2 through the related cutting edge portion 6, and a lower side face section 42 connected to a lower surface 3 through the related cutting edge portion 7 with the median plane M between the upper side and the lower side. In the cutting insert 210 in the fourth embodiment, as similar to the cutting insert 1 in the first embodiment, the three cutting edge portions 6 are continuous substantially on the intersection ridge portion between the upper surface 2 and the peripheral side surface 4, and the three cutting edge portions 7 are continuous substantially on the intersection ridge portion between the lower surface 3 and the peripheral side surface 4. Therefore, each of the upper side face section 41 and the lower side face section 42 is formed in an annularly-shape and is a collector composed of three side surface sections each related to one cutting edge portion. It should be noted that an independent upper side surface section or an independent lower side surface section may be formed in each cutting edge portion.

Each of the upper side face section 41 and the lower side face section 42 is formed to be inclined to the cutting insert outward side toward the median plane M. That is, a negative flank angle about the cutting edge portion 6 is made in the upper side face section 41 from the upper surface 2 toward the lower surface 3, and similarly a negative flank angle about the cutting edge portion 7 is made in the lower side face section 42 from the lower surface 3 toward the upper surface 2. It should be noted that the upper side face section 41 corresponds to a first side face section in the present invention, and the lower side face section 42 corresponds to a second side face section in the present invention, but these relationships may be reversed.

It should be noted that a connecting portion (herein extending on the median plane) between the upper side face section 41 and the lower side face section 42 is not limited to being simply formed to be in a linear shape, but may be formed in a curved surface shape. In addition, each of the upper side face section 41 and the lower side face section 42 is not necessarily inclined over its entirety as described above. For example, only a section thereof inclined to the cutting insert outward side toward the median plane M may be provided in the related end surface side alone.

This cutting insert 201 is, as similar to the aforementioned cutting insert 1, attached to the tool body of the rotary cutting tool as the side cutter to be used for groove processing.

In general, large cutting forces are applied to the cutting edge tip end at the time of attaching the cutting insert to the tool body in the side cutter for use. In addition, the force in the direction of pulling the cutting insert to be away from the tool body in the side cutter is applied to the peripheral side surface 4 in abutment with the tool body on a basis of the screw for fixing the cutting insert to apply the force to cause the cutting insert to float from the tool body. However, when the peripheral side surface 4 is configured as in the case of the cutting insert 201 in the fourth embodiment and the side wall surface of the insert attaching seat is formed in the concave shape adapted for the peripheral side surface, also in a case where the force in the direction of pulling the cutting insert 201 to be away from the tool body in the side cutter is applied to the cutting insert, the force in the direction of holding down the cutting insert 201 on the insert attaching seat is applied to the cutting insert 201 by the tool body. Therefore the cutting insert 201 can be more stably fixed.

Figure 17:
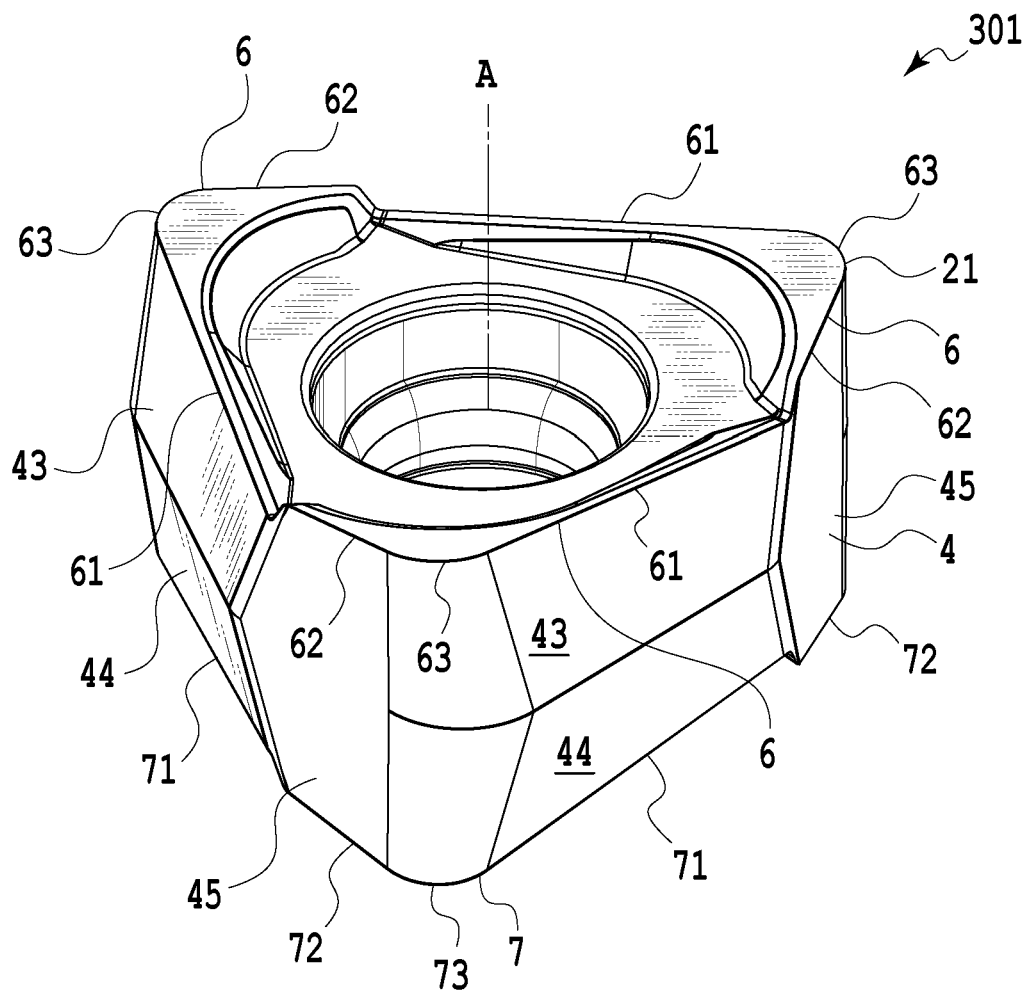
FIG. 17 is a perspective view of a cutting insert according to a fifth embodiment in the present invention.
Figure 18:
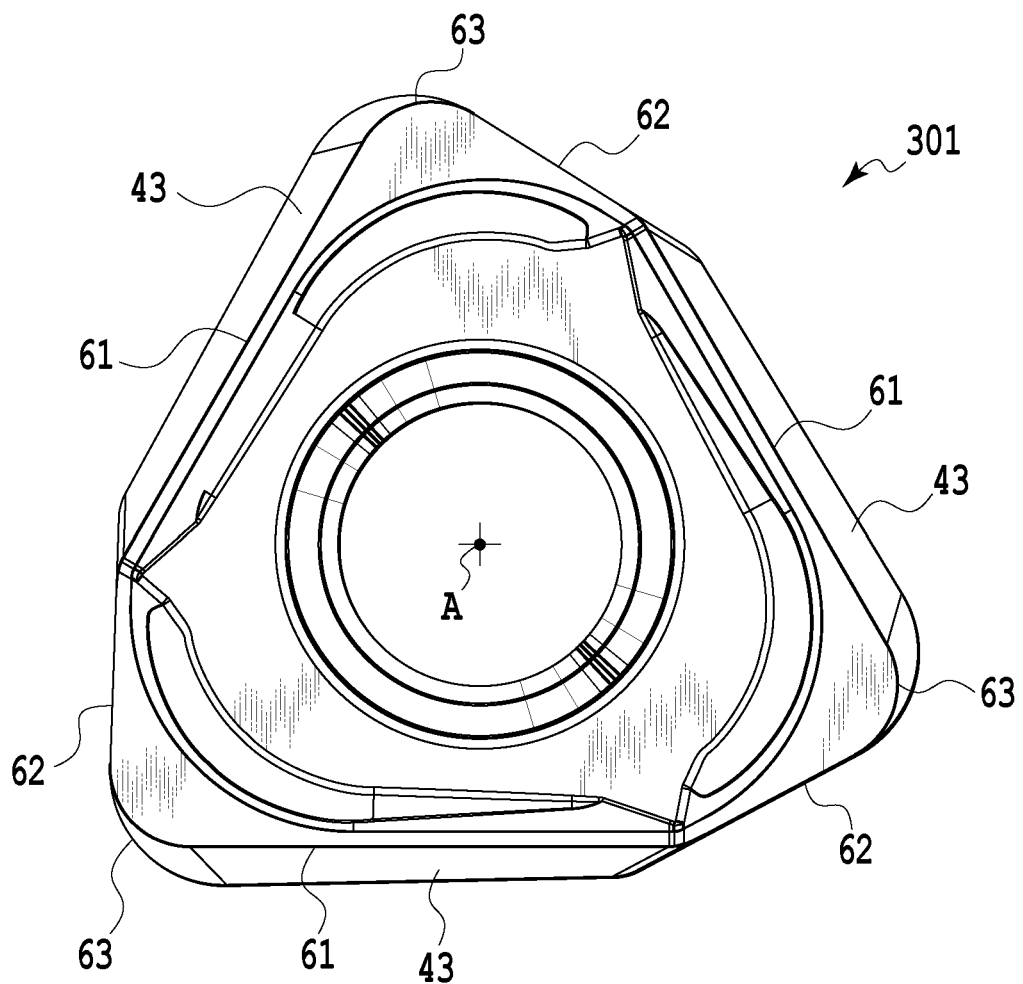
FIG. 18 is a plan view of the cutting insert according to the fifth embodiment in the present invention.
Figure 19:
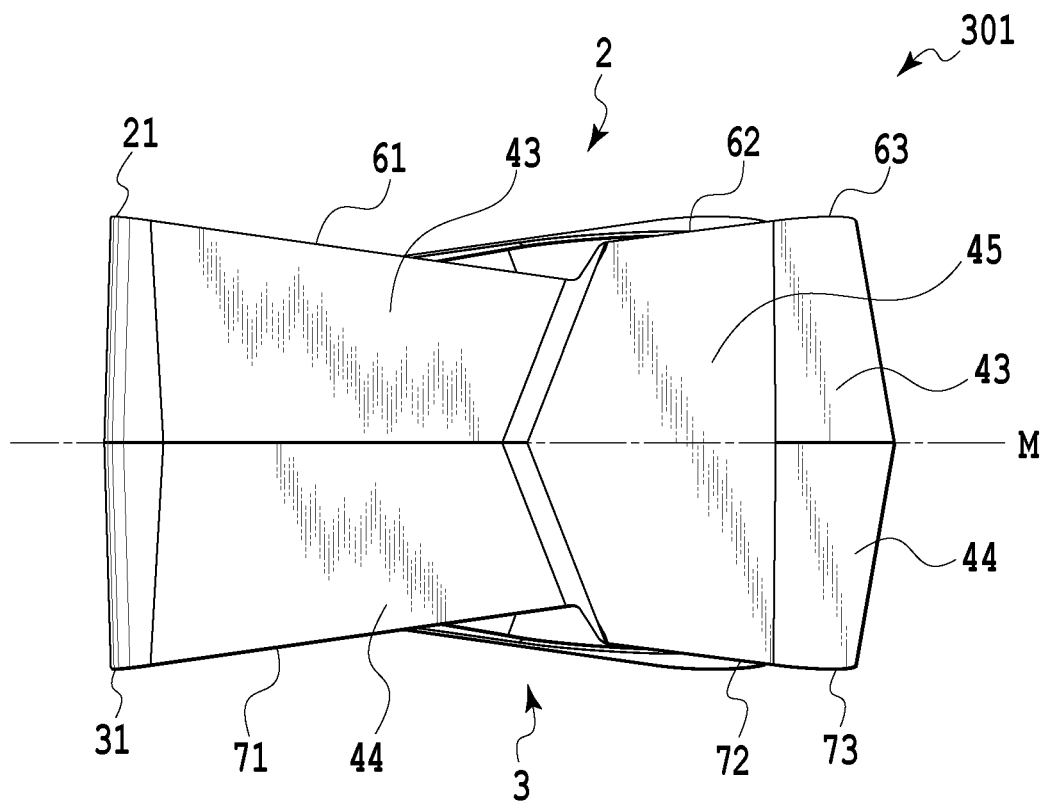
FIG. 19 is a side view of the cutting insert according to the fifth embodiment in the present invention.

Next, an explanation will be made of a cutting insert 301 according to a fifth embodiment in the present invention with reference to FIG. 17 to FIG. 19. In the following, however, characteristic differences of the cutting insert 301 from the cutting insert 201 in the fourth embodiment as described above will be explained. In the following explanation and figures, components identical to those already explained will be referred to as identical codes, and an overlap explanation thereof will be omitted.

In the cutting insert 301, only side surface sections 43 and 44 in a peripheral side surface 4 adjacent to major cutting edges 61 and 71 and corner cutting edges 63 and 73 are formed as inclined surface sections as in the cutting insert 201 of the fourth embodiment. In addition, a surface section 45 of the peripheral side surface 4 adjacent to minor cutting edges 62 and 72 (surface section 45 between the minor cutting edge 62 in the upper surface 2-side and the minor cutting edge 72 in the lower surface 3-side that is substantially surface-symmetric to the minor cutting edge 62 about the median plane M) is configured as a single plane, and is formed to extend substantially in parallel to the axis A.

Figure 20:
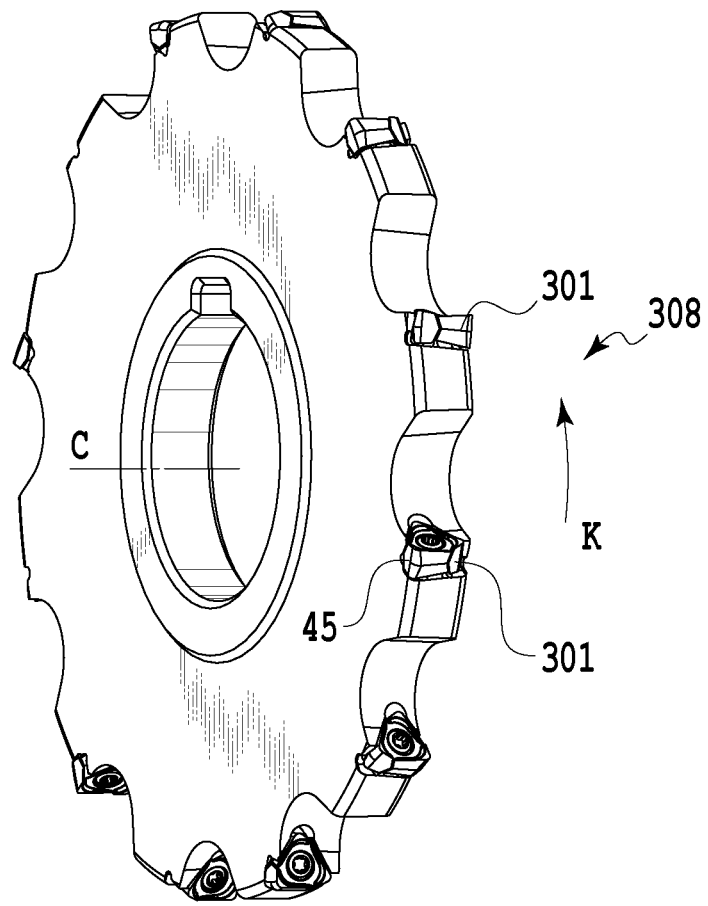
FIG. 20 is a perspective view of a cutting tool according to the fifth embodiment in the present invention, to which the cutting insert in FIG. 17 is attached.

FIG. 20 illustrates a rotary cutting tool 308 that is the side cutter in which the cutting inserts 301 are removably attached. In the cutting tool 308, the surface section 45 of the peripheral side surface 4 adjacent to the minor cutting edges 62 and 72 is one of locations the most adjacent to the side wall portion of a groove at cutting work. Therefore, according to the cutting insert 301, the fixation effect of the cutting insert above-mentioned in regard to the cutting insert 201 in the fourth embodiment can be obtained while the surface section 45 avoids interference with the groove wall as much as possible.

The present invention is explained by the above-mentioned embodiments and the like with some degree of concreteness, but the present invention is not limited to the embodiments and the like. In regard to the present invention, it should be understood that various kinds of improvements and changes are possible without departure from the spirit and the scope of the invention described in claims. That is, the present invention includes all modifications and applications, and its equivalents contained in the concept of the present invention defined in claims.

The invention claimed is:

1. A cutting insert comprising:
a first end surface and a second end surface at the opposite side to each other, each of the first end surface and the second end surface having a contour of substantial rotation symmetry around an axis (A) defined to extend through the first end surface and the second end surface, the contour of the first end surface and the contour of the second end surface being substantially plane-symmetrical about a median plane (M) which is defined to be perpendicular to the axis and bisect the cutting insert, each of the first end surface and the second end surface being configured in a way that raised corners and lowered corners are alternately positioned, and each of the lowered corners having an inner angle larger than that of the raised corner and being closer to the median plane than the raised corner;
a peripheral side surface extending between the first end surface and the second end surface;
at least three first cutting edge portions formed in an intersection ridge portion between the first end surface and the peripheral side surface, each including a corner cutting edge, a major cutting edge and a minor cutting edge in such a manner that the corner cutting edge extends along the related raised corner, the major cutting edge extends from one end portion of the corner cutting edge toward one lowered corner adjacent thereto, and the minor cutting edge extends from the other end portion of the corner cutting edge toward the other lowered corner adjacent thereto, wherein a distance between the raised corner and the one lowered corner between which the major cutting edge extends is longer than a distance between the raised corner and the other lowered corner between which the minor cutting edge extends, the major cutting edge has an inclined section closer to the median plane as a distance from the corner cutting edge is increased, and the minor cutting edge has an inclined section closer to the median plane as a distance from the corner cutting edge is increased; and
at least three second cutting edge portions formed in an intersection ridge portion between the second end surface and the peripheral side surface, each including a corner cutting edge, a major cutting edge and a minor cutting edge in such a manner that the corner cutting edge extends along the related raised corner, the major cutting edge extends from one end portion of the corner cutting edge toward one lowered corner adjacent thereto, and the minor cutting edge extends from the other end portion of the corner cutting edge toward the other lowered corner adjacent thereto, wherein a distance between the raised corner and the one lowered corner between which the major cutting edge extends is longer than a distance between the raised corner and the other lowered corner between which the minor cutting edge extends, the major cutting edge has an inclined section closer to the median plane as a distance from the corner cutting edge is increased, and the minor cutting edge has an inclined section closer to the median plane as a distance from the corner cutting edge is increased.

2. The cutting insert according to claim 1, wherein
in each of the first cutting edge portions, the corner cutting edge is formed substantially in parallel to the median plane (M), and
in each of the second cutting edge portions, the corner cutting edge is formed substantially in parallel to the median plane (M).

3. The cutting insert according to claim 1, wherein
a distance between the first cutting edge portion and the median plane (M) is the shortest at a section in the major cutting edge of the first cutting edge portion, the section being away from the lowered corner adjacent to the major cutting edge, and
a distance between the second cutting edge portion and the median plane (M) is the shortest at a section in the major cutting edge of the second cutting edge portion, the section being away from the lowered corner adjacent to the major cutting edge.

4. The cutting insert according to claim 3, wherein
in a planar view of the first end surface, the major cutting edge in the first cutting edge portion is formed to protrude to the cutting insert outward side at the section in the major cutting edge, the section being away from the lowered corner adjacent to the major cutting edge, and
in a planar view of the second end surface, the major cutting edge in the second cutting edge portion is formed to protrude to the cutting insert outward side at the section in the major cutting edge, the section being away from the lowered corner adjacent to the major cutting edge.

5. The cutting insert according to claim 1, wherein
the major cutting edge of the first cutting edge portion is connected to the minor cutting edge of the adjacent first cutting edge portion at the lowered corner, a distance between the first cutting edge portion and the median plane (M) is the shortest in a major cutting edge side end portion of the first cutting edge portion, the major cutting edge of the second cutting edge portion is connected to the minor cutting edge of the adjacent second cutting edge portion at the lowered corner, and a distance between the second cutting edge portion and the median plane (M) is the shortest in a major cutting edge side end portion of the second cutting edge portion.

6. The cutting insert according claim 1, wherein an inner angle of the raised corner in the first end surface is an obtuse angle, wherein a flat cutting edge is formed in the minor cutting edge of the first cutting edge portion, and an inner angle of the raised corner in the second end surface is an obtuse angle, wherein a flat cutting edge is formed in the minor cutting edge of the second cutting edge portion.

7. The cutting insert according to claim 1, wherein the first end surface includes at least one outside end face portion and an inside end face portion in such a manner that each outside end face portion is adjacent to the related first cutting edge portion and is formed to act as a rake face of the first cutting edge portion, and the inside end face portion is positioned closer to the inside than the outside end face portion and is formed closer to the median plane than the outside end face portion, and the second end surface includes at least one outside end face portion and an inside end face portion in such a manner that each outside end face portion is adjacent to the second cutting edge portion and is formed to act as a rake face of the second cutting edge portion, and the inside end face portion is positioned closer to the inside than the outside end face portion and is formed closer to the median plane than the outside end face portion.

8. The cutting insert according to claim 7, wherein in the first end surface, the outside end face portion is formed as a single flat surface or a single curved surface, wherein at least more than half of the adjacent first cutting edge portion extends on a smooth extension plane of the outside end face portion, and in the second end surface, the outside end face portion is formed as a single flat surface or a single curved surface, wherein at least more than half of the adjacent second cutting edge portion extends on a smooth extension plane of the outside end face portion.

9. The cutting insert according to claim 7, wherein in the first end surface, the outside end face portion is discontinuous with the inside end face portion and is inclined to the median plane (M), and in the second end surface, the outside end face portion is discontinuous with the inside end face portion and is inclined to the median plane (M).

10. The cutting insert according to claim 1, wherein the peripheral side surface includes a first side face section connected to the first end surface through the related first cutting edge portion and a second side face section connected to the second end surface through the related second cutting edge portion, and each of the first side face section and the second side face section has a section inclined to the cutting insert outward side toward the median plane.

11. The cutting insert according to claim 10, wherein the first side face section is formed to be adjacent to the major cutting edge and the corner cutting edge in the related first cutting edge portion, the second side surface section is formed to be adjacent to the major cutting edge and the corner cutting edge in the related second cutting edge portion, and a section of the peripheral side surface between the minor cutting edge of the first cutting edge portion and the minor cutting edge of the second cutting edge portion substantially plane-symmetrical to the first cutting edge portion about the median plane (M) is formed of a single plane.

12. A rotary cutting tool comprising a tool body including a first tool body end surface and a second tool body end surface at the opposite side to each other, and an outer peripheral surface between the first tool body end surface and the second tool body end surface, wherein a plurality of cutting inserts are removably attached to the tool body, comprising:

at least one first insert attaching seat to which the cutting insert according to claim 1 is attached in such a manner as to use the first cutting edge portion and that is opened to the first tool body end surface; and at least one second insert attaching seat to which the cutting insert according to claim 1 is attached in such a manner as to use the second cutting edge portion and that is opened to the second tool body end surface.

* * * * *